(12) United States Patent
Gewickey et al.

(10) Patent No.: US 12,011,822 B2
(45) Date of Patent: *Jun. 18, 2024

(54) SOCIAL ROBOT WITH ENVIRONMENTAL CONTROL FEATURE

(71) Applicant: WARNER BROS. ENTERTAINMENT INC., Burbank, CA (US)

(72) Inventors: Gregory I. Gewickey, Simi Valley, CA (US); Lewis S. Ostrover, Los Angeles, CA (US)

(73) Assignee: WARNER BROS. ENTERTAINMENT INC., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/842,730

(22) Filed: Jun. 16, 2022

(65) Prior Publication Data

US 2022/0395983 A1 Dec. 15, 2022

Related U.S. Application Data

(63) Continuation of application No. 16/408,403, filed on May 9, 2019, now Pat. No. 11,370,125, which is a (Continued)

(51) Int. Cl.
*B25J 11/00* (2006.01)
*B25J 13/00* (2006.01)
*G06N 3/008* (2023.01)

(52) U.S. Cl.
CPC ......... *B25J 11/0005* (2013.01); *B25J 13/003* (2013.01); *G06N 3/008* (2013.01)

(58) Field of Classification Search
USPC ................................. 700/245–264
See application file for complete search history.

(56) References Cited

U.S. PATENT DOCUMENTS 5,367,454 A * 11/1994 Kawamoto ............ G06N 3/004
715/728
5,832,189 A * 11/1998 Tow ........................ G06N 3/008
901/47

(Continued)

FOREIGN PATENT DOCUMENTS

JP 2006146630 A 6/2006
JP 2009087074 A 4/2009

(Continued)

OTHER PUBLICATIONS

De Carolis, B., et al., "Simulating empathic behavior in a social assistive robot", Multimed Tools Appl, 2017, vol. 76, pp. 5073-5094.

(Continued)

*Primary Examiner* — Jonathan L Sample
(74) *Attorney, Agent, or Firm* — BOOKOFF MCANDREWS, PLLC

(57) ABSTRACT

A method and apparatus for controlling a social robot includes operating an electronic output device based on social interactions between the social robot and a user. The social robot utilizes an algorithm or other logical solution process to infer a user mental state, for example a mood or desire, based on observation of the social interaction. Based on the inferred mental state, the social robot causes an action of the electronic output device to be selected. Actions may include, for example, playing a selected video clip, brewing a cup of coffee, or adjusting window blinds.

21 Claims, 14 Drawing Sheets

Related U.S. Application Data continuation of application No. PCT/US2017/060951, filed on Nov. 9, 2017.

(60) Provisional application No. 62/420,492, filed on Nov. 10, 2016.

(56) References Cited

U.S. PATENT DOCUMENTS

| | | | |
|---|---|---|---|
| 6,031,549 A * | 2/2000 | Hayes-Roth | G06T 13/40 345/474 |
| 6,175,772 B1 * | 1/2001 | Kamiya | G06N 3/008 701/1 |
| 6,230,111 B1 * | 5/2001 | Mizokawa | G06N 3/004 702/182 |
| 6,513,046 B1 * | 1/2003 | Abbott, III | G06F 16/40 |
| 6,959,166 B1 * | 10/2005 | Gabai | G09B 5/04 709/228 |
| 7,216,112 B2 * | 5/2007 | Ohtani | B25J 9/161 706/26 |
| 7,222,076 B2 * | 5/2007 | Kobayashi | G10L 13/033 704/275 |
| 7,689,319 B2 * | 3/2010 | Kanda | B25J 9/1671 700/245 |
| 8,565,922 B2 * | 10/2013 | Kidd | G06N 3/008 700/259 |
| 8,751,042 B2 * | 6/2014 | Lee | G06N 5/02 700/264 |
| 8,812,171 B2 * | 8/2014 | Filev | G01C 21/3608 701/1 |
| 8,892,495 B2 * | 11/2014 | Hoffberg | F24F 11/62 706/48 |
| 8,909,370 B2 * | 12/2014 | Stiehl | B25J 9/1671 700/264 |
| 9,079,313 B2 * | 7/2015 | Olivier, III | G06F 3/017 |
| 9,956,687 B2 * | 5/2018 | Florencio | G06N 3/008 |
| 10,008,196 B2 * | 6/2018 | Maisonnier | B25J 11/003 |
| 10,062,245 B2 * | 8/2018 | Fulker | G06F 3/0482 |
| 10,176,725 B2 * | 1/2019 | Fischer | G09B 19/00 |
| 10,687,183 B2 * | 6/2020 | Shumaker | H04W 4/21 |
| 2004/0249510 A1 * | 12/2004 | Hanson | B25J 11/0015 700/245 |
| 2005/0102246 A1 * | 5/2005 | Movellan | G06V 40/165 382/118 |
| 2007/0039450 A1 * | 2/2007 | Ohshima | G10H 5/005 84/616 |
| 2008/0183573 A1 * | 7/2008 | Muschetto | G06Q 30/0242 705/14.73 |
| 2009/0055019 A1 * | 2/2009 | Stiehl | B25J 9/1671 901/17 |
| 2011/0197236 A1 * | 8/2011 | Rao | H04L 67/535 725/74 |
| 2012/0209433 A1 * | 8/2012 | Paz Rodriguez | B25J 11/0005 901/1 |
| 2014/0039680 A1 * | 2/2014 | Angle | B25J 9/1697 901/1 |
| 2014/0200416 A1 * | 7/2014 | Kashef | G16H 20/70 600/479 |
| 2014/0250200 A1 * | 9/2014 | Geurts | H04L 51/10 709/206 |
| 2014/0250200 A1 | 9/2014 | Geurts | |
| 2014/0277735 A1 * | 9/2014 | Breazeal | B25J 9/0003 700/259 |
| 2015/0088310 A1 * | 3/2015 | Pinter | G16H 40/67 901/1 |
| 2015/0314454 A1 * | 11/2015 | Breazeal | G10L 15/32 700/259 |
| 2016/0063874 A1 * | 3/2016 | Czerwinski | G16H 50/20 434/236 |
| 2016/0127641 A1 * | 5/2016 | Gove | H04N 23/64 348/143 |
| 2016/0151917 A1 * | 6/2016 | Faridi | B25J 11/0015 700/259 |
| 2016/0199977 A1 * | 7/2016 | Breazeal | B25J 11/0015 700/246 |
| 2016/0229058 A1 * | 8/2016 | Pinter | G05D 1/0088 |
| 2017/0127150 A1 * | 5/2017 | Kuo | H04N 21/47202 |
| 2017/0308267 A1 * | 10/2017 | Kozloski | G06F 40/30 |
| 2018/0070143 A1 * | 3/2018 | Joffe | G06F 16/738 |
| 2019/0193273 A1 * | 6/2019 | Favis | B25J 11/001 |
| 2019/0311067 A1 * | 10/2019 | Waye | H04N 21/47202 |

FOREIGN PATENT DOCUMENTS

| | | |
|---|---|---|
| JP | 2016076799 A | 5/2016 |
| JP | 2016522465 A | 7/2016 |
| KN | 20130093290 | 8/2013 |
| RU | 2011 104 786 A | 8/2012 |
| WO | WO 2016/011159 A1 | 1/2016 |
| WO | WO 2018/022808 A1 | 2/2018 |

OTHER PUBLICATIONS

Meghdari, A., et al., "Spontaneous Human-Robot Emotional Interaction Through Facial Expressions", International Conference on Financial Cryptography and Data Security, Berlin, Heidelberg, 2016, pp. 351-361.

Murray, J. C., et al., "Developing Preferential Attention to a Speaker: A Robot Learning to Recognise its Carer", IEEE Symposium on Artificial Life, Piscataway, NJ, 2009, pp. 77-84.

* cited by examiner

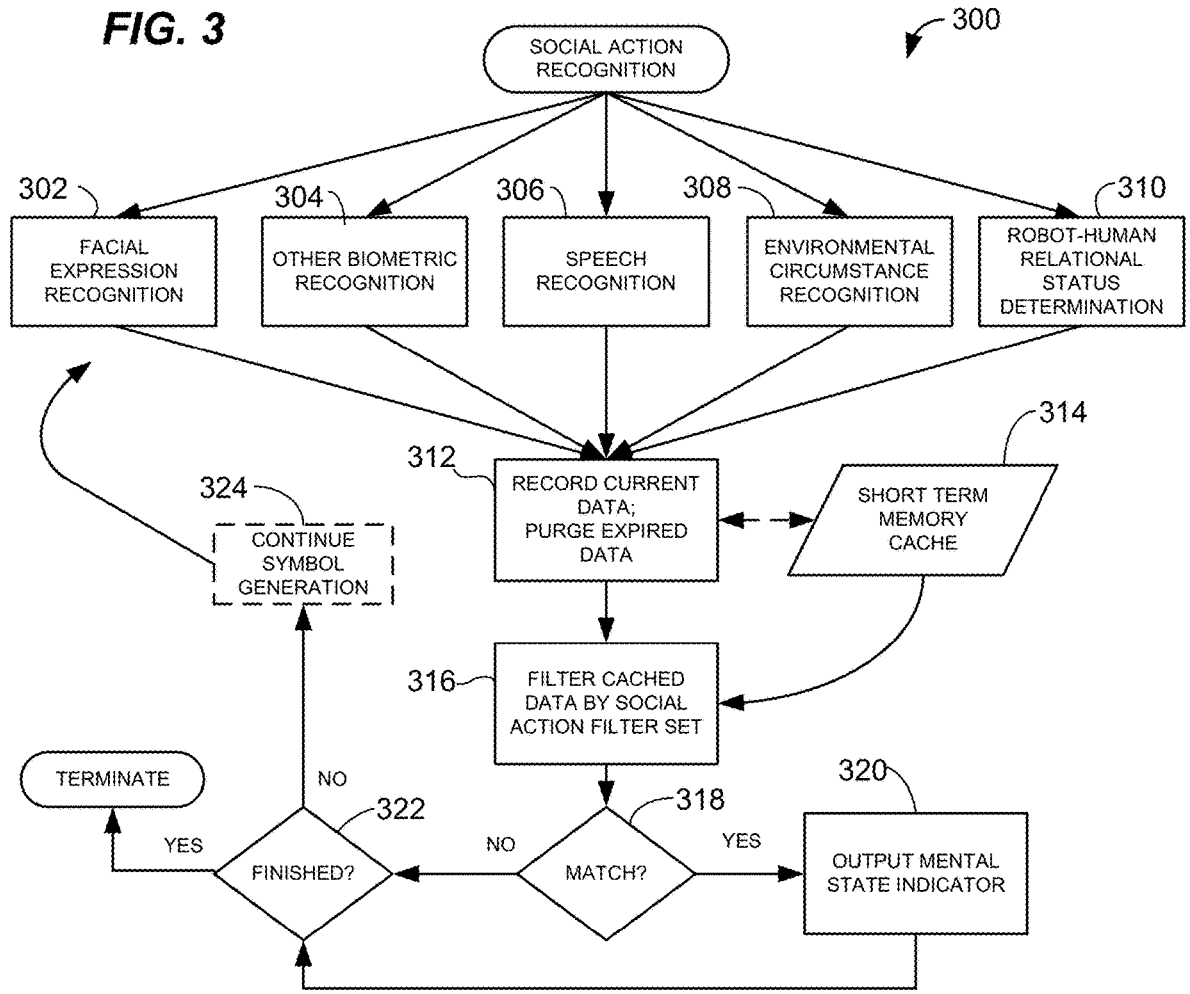

1610 — INTERACTING SOCIALLY WITH THE USER BY OPERATING A SOCIAL EXPRESSION COMPONENT COUPLED TO AT LEAST ONE CIRCUIT FOR DRIVING COMPONENTS OF THE SOCIAL ROBOT AND COMPRISING A HUMAN-RECOGNIZABLE EXPRESSIVE FEATURE CONTROLLED BY THE AT LEAST ONE CIRCUIT ACCORDING TO A SOCIAL BEHAVIOR ALGORITHM, WHEREIN THE AT LEAST ONE CIRCUIT COMPRISES ONE OR MORE PROCESSORS

1620 — DETERMINING, BY THE ONE OR MORE PROCESSORS, USER BEHAVIOR BASED AT LEAST IN PART ON DATA FROM A VIDEO CAMERA AND A MICROPHONE COUPLED TO THE AT LEAST ONE CIRCUIT

1630 — CORRELATING, BY THE ONE OR MORE PROCESSORS, THE USER BEHAVIOR TO SOCIAL BEHAVIOR OF THE SOCIAL ROBOT

1640 — GENERATING A DATA SIGNAL BASED ON THE CORRELATING

1650 — TRANSMITTING THE DATA SIGNAL CONFIGURED FOR CAUSING AN ELECTRONIC OUTPUT DEVICE TO RESPOND TO INFORMATION ENCODED BY THE DATA SIGNAL

1710 — DETERMINING A CURRENT MENTAL STATE INDICATOR BASED ON THE CORRELATING

1720 — CAUSING SELECTION OF AN IDENTIFIER OF A PRERECORDED AUDIO-VIDEO CONTENT CLIP BASED ON COMPARING SEMANTIC METADATA ASSOCIATED WITH THE IDENTIFIER TO THE CURRENT MENTAL STATE INDICATOR

1730 — TRANSMITTING THE CURRENT MENTAL STATE INDICATOR TO A REMOTE SERVER, AND RECEIVING THE IDENTIFIER FROM THE REMOTE SERVER

1740 — DETERMINING THE CURRENT MENTAL STATE INDICATOR COMPRISING AT LEAST ONE OF AN INDICATOR OF A USER MOOD OR AN INDICATOR OF A USER DESIRE

1750 — CONFIGURING THE DATA SIGNAL SO THAT THE PRERECORDED AUDIO-VIDEO CONTENT CLIP IS OUTPUT BY THE AUDIO-VIDEO OUTPUT DEVICE

1810 — CONFIGURING THE DATA SIGNAL FOR CAUSING THE ELECTRONIC OUTPUT DEVICE TO RESPOND, WHEREIN THE ELECTRONIC OUTPUT DEVICE COMPRISES A HOME APPLIANCE AND THE INFORMATION ENCODED BY THE DATA SIGNAL COMPRISES OPERATING INSTRUCTIONS FOR THE HOME APPLIANCE

↓

1820 — DETERMINING THE CURRENT MENTAL STATE INDICATOR FURTHER BASED ON THE DATA SIGNAL FROM THE BIOMETRIC SENSOR

↓

1830 — SELECTING A RESPONSE FURTHER BASED ON A DETECTED CONTEXT

↓

1840 — SELECTING A RESPONSE FURTHER BASED ON A LOCATION BEACON SIGNAL

↓

1850 — SELECTING A RESPONSE FURTHER BASED ON USER PREFERENCE INFORMATION

SOCIAL ROBOT WITH ENVIRONMENTAL CONTROL FEATURE

CROSS REFERENCE TO RELATED APPLICATION

This application is a continuation of U.S. application Ser. No. 16/408,403 filed on May 19, 2019, which is a continuation of International Patent Application No. PCT/US17/60951, filed Nov. 9, 2017, which claims priority pursuant to 35 U.S.C. § 119(e) to U.S. Provisional Patent Application No. 62/420,492 filed Nov. 10, 2016, each of which are hereby incorporated by reference in their entireties.

FIELD

The present disclosure pertains to social robots, and to methods for controlling social robots.

BACKGROUND

Various humanoid, non-humanoid, and combined humanoid/non-humanoid robots are known in the robotic arts. A "robot" is a programmable, autonomous or semi-autonomous machine programmed to react to sensed environmental inputs and thereby interact with some independent aspect of its environment. Non-humanoid robots are often designed to perform specific tasks that do not involve interacting with humans, for example, assembly-line manufacturing, or automated handling of cargo and the like, that involve interacting with inanimate objects only. A humanoid robot is constructed to resemble a human, including features recognizable by people as a torso, arms, legs, a head, a face, and so forth. Realistic humanoid robots are complex and expensive to build, and accordingly are not common. A combined humanoid/non-humanoid robot includes a least one human-recognizable feature, combined with features that are not humanoid. For example, a smartphone that includes a speech response feature in response to human speech is a sort of combined humanoid/non-humanoid robot. Another example is a virtual robot used to interact with human users in virtual environments such as online social networking sites or video games, appearing to be another user.

Both humanoid and combined humanoid/non-humanoid robots are often used as social robots. As used herein, a "social robot" is an interactive machine designed to evoke an emotional or social behavioral response from a human or other social animal that interacts with it, by exhibiting behaviors that are recognizably social in nature for the humans or other social animals with which the social robot is interacting.

Behaviors that are recognizably social in nature may include, for example, vocalization, speech, body language (e.g., posturing), facial expression, and other behaviors as described herein below.

Like any other computing machine that interacts with a human user, a robot may be capable of leveraging the processing power and vast amount of data in a computer of a computer network to provide content that a user is interested in. With the advent of the "Internet of things," more appliances and devices are connected to wide-area networks, and can be controlled using a network terminal. Network terminals are designed to respond to user commands and can be programmed to detect and record user preferences for identifying advertising or other content likely to be of interest to the user. However, network terminals are not designed to mimic human social behavior; they are instead optimized for direct user interaction with special-purpose applications generally designed for accessing various types of content: e.g., web pages, video, databases, and so forth. In contrast, social robots by definition include features designed for social behavior, for example, displaying mood or emotion. This social function of robots is not viewed as useful for the sorts of functions that computer terminals perform; indeed, it might seem silly to use a social robot both for social and terminal functions. The 'terminal potential' of social robots, however that might be imagined, is for the most part wasted.

It would be desirable, therefore, to provide methods for utilizing social robots in less limited ways, and to provide social robots that leverage both their social and terminal potentials to provide new, synergistic and unexpected benefits to users.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

As used herein, a 'social action' is an action performed for the purpose of eliciting a social response and is therefore performed with the awareness of the person from which a response is desired. Some actions (e.g., facial expressions) are purely social at least when performed by a robot, because there is no reason for a robot to perform the actions except to elicit a social response. Other actions (e.g., filling a glass of water for a thirsty user, or turning on an appliance) may have both a social purpose and other objectives (e.g., placing clean water in a glass without spilling). In the present application, a social action by a robot is any action for which the robot tracks a user's social response, and for which an extent of correlation between the robot's social action and the user's social response determines further robot action. Social actions by a robot may include, for example, facial expression, body language, including posturing of humanoid elements (e.g., head, arms, etc.), speech, vocalization, movement, gesture, touch, providing an object or substance to the user, removing an object or substance from the user, turning another machine on or off, controlling operation of a machine or appliance to elicit a social response, playing recorded audio or audio-video content, or any other action intended to communicate a social message or signal to the robot's user.

A social robot may be implemented as a real machine with the power to move at least part of its robotic body in a real environment. In addition, a social robot may be implemented as a virtual machine that can be expressed only in a virtual environment, such as, for example, as a robotic character in a video game environment, in an immersive virtual reality environment, or in an augmented reality (AR) environment. As used herein, the term "social robot" generally encompasses both real and virtual social robots. When specifically pointing out one of these classes of social robots, the terms "real social robot" or "virtual social robot" will be used herein.

The social robot may include one or more processors coupled to at least one circuit for driving components of the social robot, and a social expression component connected to the at least one circuit. The social expression component may include a human-recognizable expressive feature controlled by the one or more processors according to at least one social behavior algorithm. In an embodiment, the social expression component may include a video screen that displays an animated face, or expressive parts of a face such as eyes, eyebrows, mouth or lips) of the social robot.

The social robot may further include a video camera connected to the at least one circuit and positioned on the social robot for observing a user and/or the user's environment. The robot may also include a microphone connected to the at least one circuit, positioned for receiving sound from the user and/or the user's environment. The robot may include, or may be coupled to, one of more sensors for measuring one or more bodily states of the user, for example, pulse sensor, skin temperature sensor, gaze direction sensor, and so forth.

The social robot further includes a program memory, coupled to the at least one circuit and to the one or more processors. The program memory holds program instructions configured for execution by the one or more processors, causing the social robot to perform operations including: interacting socially with the user by operating the social expression component, determining user behavior based at least in part on data from the video camera and the microphone, correlating the user behavior to social behavior of the social robot, generating a data signal based on the correlating, and transmitting the data signal configured for causing an electronic output device or other electro-mechanical device (e.g. an electronically activated valve used to fill a coffee pot) to respond to information encoded by the data signal.

In more detailed aspects, the instructions are further configured for causing the social robot to perform deriving a current mental state indicator based on the correlating, and causing selection of an identifier of a prerecorded or online audio-video content clip based on comparing semantic metadata associated with the identifier to the current mental state indicator. For example, the social robot may derive an indicator for a "sleepy" mental state, and based on the time of day, the sleepy indicator, and the user's behavior patterns or past content selections, choose an identifier for a lively, rousing audio and/or video clip. In an aspect, for example, the memory of the social robot holds identifiers for prerecorded or online audio-video content clips each associated with semantic metadata pertaining to corresponding ones of the content clips, and the instructions are further configured for causing the social robot to perform executing a content-selection algorithm, thereby the causing the selection of the identifier. In an alternative, the instructions are further configured for causing the social robot to perform transmitting an indicator of the internal user state to a remote server and receiving the identifier from the remote server. In the alternative embodiment, selection of the content clip is performed by the remote server. In an alternative embodiment, a remote server may also supply the selected content.

In another aspect, determining the current mental state indicator includes determining an indicator of a user mood (happy, sleepy, bored, etc.) or an indicator of a user desire (wants quiet, wants to be entertained, etc.), using a behavior analysis algorithm. The algorithm may compare a current social interaction with past social interactions to determine a mental state. For example, if the social robot emits speech or a polite sound for obtaining attention, and in response is ignored by the user while detecting that the user is active, the robot may conclude that the user is "distracted" or "busy."

In some embodiments, the electronic output device is, or includes, an audio-video output device, and the instructions are further configured for causing the social robot to perform configuring the data signal so that the prerecorded or online audio-video content clip is output by the audio-video output device. For example, the social robot may cause a video screen located on the robot itself to display the video content clip. The video screen may also be used to display an animated face of the social robot. In an alternative, the video screen may be a separate component, located on the robot or as an independent appliance (e.g., a television or mobile phone of the user, or part of an augmented reality headset or glasses worn by the user).

In an alternative, or in addition, the electronic output device or electro-mechanical device is a home appliance, for example, a coffee maker, a faucet, a motorized window blind, an electronic lock, a home audio system, or a home theater system. The instructions may further include configuring the data signal so that it causes the home appliance to respond. For example, the information encoded by the data signal may include operating instructions for the home appliance. Thus, the social robot may analyze the social behavior of the user and anticipate or respond to such needs as the social robot is able to fulfill, by itself or in cooperation with ancillary appliances.

In another aspect, the electronic output device or electro-mechanical device may be a motor vehicle or vessel, for example, a self-driving car. In such cases, the instructions may include configuring the data signal so that it causes the motor vehicle or vessel to respond, such as by encoding vehicle operating instructions. For example, the social robot might control the audio system of the vehicle in response to detecting a social signal from the user, start or power on the vehicle if anticipating that the user will soon want to go for a ride, or direct a self-driving vehicle to transport the user to a specified destination, wherein the robot selects the destination at least in part on a current mental state determined based on social interaction between the user and the social robot.

The social robot may include a set of modules under common control with a defined relationship to one another, wherein the set as a whole is designed to interact socially with a human (or other, e.g. pet dog) companion. For example, a Jibo™ is a passive torso with a swiveling head, video-screen face, ears (audio input) and static (non-animated) speech output. A smartphone provides an example of another type of robot consisting of a passive frame, video-screen face, ears (audio input) and static (non-animated) speech output. Robots such as Asimo™ are more complex, have non-video facial features, and means of locomotion and for articulating extremities. A decision engine controls output of the social robot in response to user actions such as speech, gaze direction, facial expression, body language, and other social cues. The decision engine may be configured to exhibit a particular robot personality or mood, which may vary based on environmental factors or user commands. Further details regarding controlling a robot to express a certain personality may be as described in U.S. Provisional Patent Application No. 62/367,335, filed Jul. 7, 2016 (the "'335 Application"), which is incorporated herein in its entirety.

The '335 Application disclosed methods for selecting a social robot's response based on a personality profile in conjunction with stimulus-response pair detection. A robot is programmed to match a stimulus (including a context of the stimulus) with a response through a personality filter or profile. In an aspect, a robot response may include generating a data signal for causing an electronic output device to respond to information encoded by the data signal, for example selecting a video clip to play for the user. In other words, the personality profile of a social robot may influence the selection of content played or other actions based on the robot's personality profile, using methods as described in the '335 Application. For example, a robot with a 'child' personality may select different audio-video content for playing from a robot with an 'adult' personality, given the same social interaction and context.

In some embodiments, a robot may use a 'test' program to identify interacting human or environments in which interaction is taking place. For example, a social robot might interact with humans using a test program. The test program need not take the apparent form of a test. Instead, the test program may be designed to be perceived as a one-time set-up or configuration process, a game, or some other entertaining process that samples an interacting person's personality, while also entertaining them. For example, the test may sample the interacting human's voice, traits, mood, expressions or mannerisms, and store identifying characteristics in the person's profile for future reference. An initial interaction setup or configuration process might be executed by the robot only initially when interacting with a human, or perhaps every time a session with the robot commences, so that the robot could determine the interacting human's age, sex, height and build, mobility (i.e. whether the human is able to move freely, or bedridden, or feeble, or . . . ), spoken language (since the robot could be conversant in several), or other factors. The robot may store the person's profile, and thereby later recognize that person, e.g. by employing facial recognition software, when that person is again interacting with the robot. Using voice recognition software, once a person has been identified, then even if her/his appearance changes so as to render the person unrecognizable visually, the robot may still make the identification based on voice.

Similarly, via object recognition or image analysis software, the robot may determine characteristics of the space which the robot and human occupy (e.g. indoors, outdoors, in a small area or a large one, what time it is, whether it's daylight or nighttime, etc.) so that appropriate conversation and related behaviors could be best managed. For example, it might seem inappropriate to speak of how lovely the stars appear to be if it's broad daylight, and there's no need to say "Let's go for a walk" if the human can't move or is preparing for bedtime. In this manner, the robot may either mimic or counterpoint the voice, traits, mood(s), expressions or mannerisms depending upon what is circumstantially appropriate. If, for example, the robot later detects at a subsequent meeting (for example by identifying through machine learning or AI or consultation with templates or consultation with databases of examples) that the human is depressed, then it could set about trying to lift the human's spirits by telling a joke, offering to play a game, playing a favorite song or video clip, or other mood-lifting interaction. All of the above interactions may take place virtually, i.e. with the robot and the human(s) in different places, interacting by way of some audiovisual system—e.g. via Skype.

In another aspect, operation of a social robot is integrated with a local or remote database of content that is selectively shared with the user of the social robot, in response to a current stimulus or anticipated future condition. For example, the database of content may include video clips, audio-video clips, or audio clips that are indexed based on their semantic content. The social robot may be configured to output a selected one of the clips for any social purpose. For example, if the social robot senses that its user is unhappy, it may select a humorous clip from clips of the user's known favorite content or characters. For further example, if the social robot is commenting on a sensed social situation, for example, to encourage the user to get some exercise, it might play a clip that is marked as appropriate for users with personal or demographic characteristics that matches the current user and that in some way reminds the user to get up and do some exercise. Accordingly, users may be entertained by the context and selection of clips selected by the social robot's content selection algorithm. In more detailed aspects, and for further example, the robot may:

learn what type of relevant content clips the current user or users are likely to pay attention to, for example by identifying areas, genres, works (prose, poetry, pictures, videos, art, etc.) that interest the target user(s) by questioning or otherwise 'testing' the target users(s) for interest levels, and then audio-visually output the selected content clips;
  wirelessly send selected content clips (or have them sent from a remote server) to audiovisual display gear (e.g., speakers, a phone, a tablet, a PC, a smart TV, an AR headset or glasses, etc.) independent of the robot so that the target user(s) can see and/or hear the content clip synchronized to a social interaction involving the social robot, or in response to an authorized user request;
  command a wireless device such as, for example, the Amazon™ Echo™ and Fire Stick™, to tune in or otherwise obtain relevant content for the target user(s), wherein the content is selected by the social robot based on user/situational parameters or selected by the user.

The method and apparatus of the present disclosure may be embodied in social robots of various types, and in computer networks used to support operation of social robots. For example, selection of relevant content clips may be performed partly or entirely using cloud computing resources, with results shared with a local robot for use locally. The technical description that follows enables all of the functional abilities of a social robot that are summarized above.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 3 is a flowchart showing aspects of a method by a social robot for determining a symbolic output (e.g., a mental state indicator) based on social actions of a user.

FIG. 4 is a table illustrating aspects of social action data for use in connection with the method of claim 3.

FIG. 16 is a flow chart illustrating an example of a method for operating a virtual social robot for producing an environmental control output based on social interaction with a user (or users).

FIGS. 17-18 are flowcharts illustrating further aspects of the method of FIG. 16.

DETAILED DESCRIPTION

Figure 1:
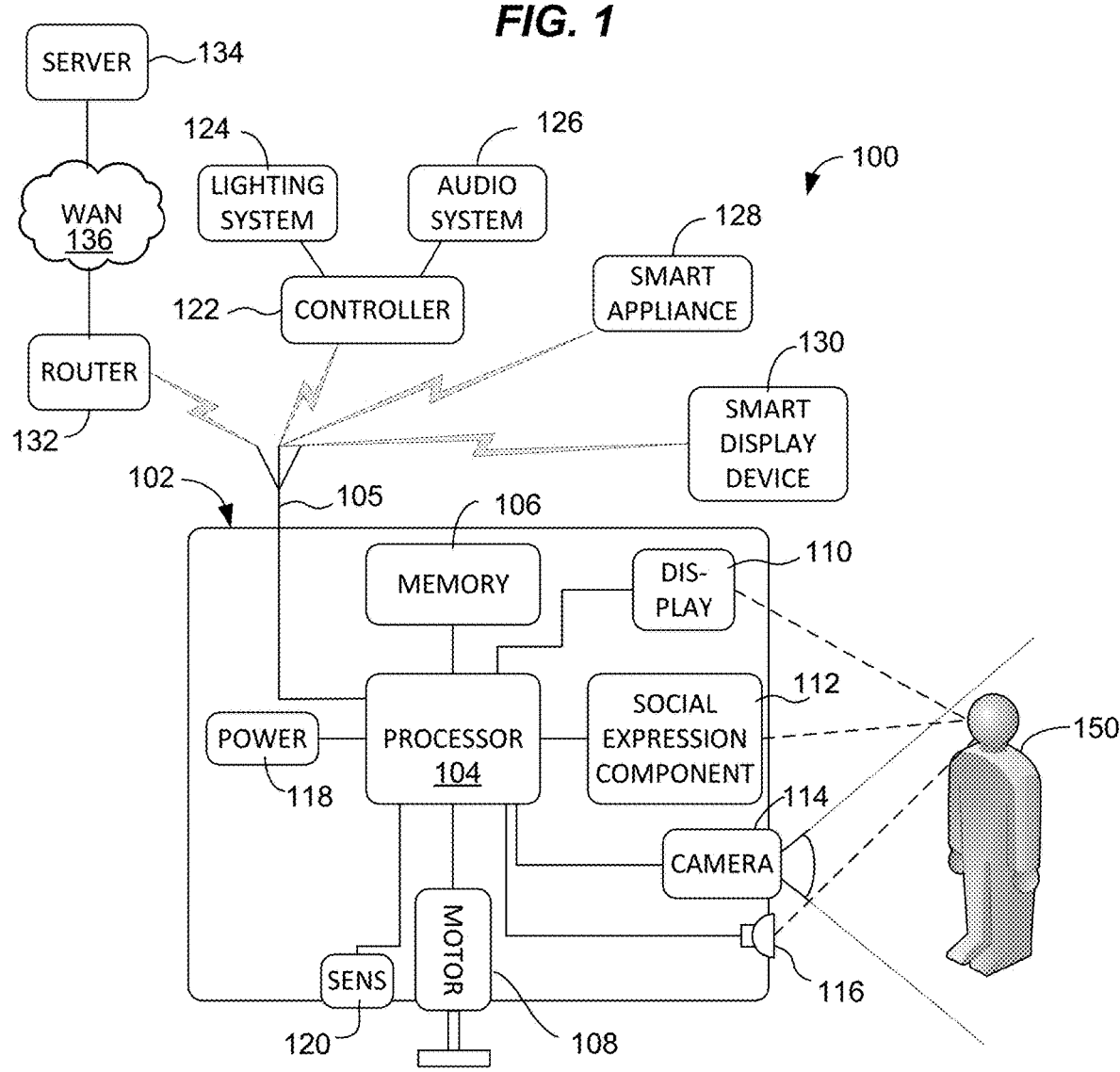
FIG. 1 is a block diagram illustrating aspects of a system and method for a social robot that selects entertainment content or other response based on social interaction with a user.

Referring to FIG. 1, a social robot system 100 including a social robot 102 for selecting digital content (e.g., recorded or online audio-video content) or other environmental control action is illustrated. It should be appreciated that the social robot 102 may be adapted for selecting other environmental control functions in response to a user's social behavior. The system includes various modules and data structures that may be incorporated in hardware, software, firmware, or in some combination of the foregoing. The hardware, software, firmware, or combination may be implemented locally in the social robot itself, or in part using computer processing power that is in communication with the social robot using a computer or data communications network.

The social robot 102 may comprise an "Internet of Things" (IoT) node in a system 100 that includes other IoT nodes, Local Area Network (LAN) nodes, or other computer networks. The social robot can take an environmental control action by sending a control signal to another node in the system 100. As used herein, an "environmental control action" includes signaling to a machine or device that responds to the signaling by altering an environment of the user 150 who is interacting socially with the social robot 102. For example, a smart display device 130 may receive a signal from the robot 102, and in response play a selected video clip that relates semantically to social signaling of the user 150 that is detected by the social robot. A smart appliance 128 (e.g., a coffee maker or other beverage or food preparation device) may receive a signal from the robot 102, and in response brew or dispense a beverage or food for the user 150. A smart home controller 122 may receive a signal from the robot 102, and in response adjust the lighting in the user's 150 environment by signaling to a smart lighting system 124, or control playing of music or ambient sounds by signaling to a smart audio system 126.

The smart display device 130 may be, or may include, a smartphone, notepad computer, personal computer, smart TV, virtual reality headset, augmented reality headset, or other display device. The robot 100 may send a signal from transmitter to the smart display device 130, directly in a peer-to-peer transmission, or indirectly through a computer and/or communications network. The signal from the robot 102 to the display node 130 may identify a content video clip (for example, "clip #12345") or digital graphic image that the robot 102 is requesting that that smart display device 130 play or display. The smart display device 130 may be located within sight of the user 150 who is interacting socially with the social robot 102, for example, in the same room. The requested video clip or image may reside in a memory of the display node 130 or may be requested by the device 130 or robot 102 from a data store, for example, from the server 134 via a router 132 and wide area network (WAN) 136, or from an online source. In addition, or in the alternative, the social robot may play or display the requested video clip or digital image using an internal display device 110.

Accordingly, a purpose of the social interaction between the user 150 and the robot 102, and processing performed by the robot 102 as described in more detail herein, includes pleasing the user 150 by displaying content (e.g., videos or still images) playing audio content, or otherwise adjusting the user's environment in a way that complements the user's moods or desires, in part by selecting actions that surprise, delight, or otherwise engage the user. In other words, the user does not need to request that specific content be played, or specific actions be taken to adjust the environment, for example. Instead, the robot 102 or other element of the system 100 (e.g., the server 134) selects appropriate content based on social interaction of the user 150 with the robot 102. The social action may be completely non-verbal, and need not be a response to any explicit, verbal request or command by the user that requested action be taken. Instead, operation of the robot 102 and system 100 anticipates actions that will be pleasing to the user or fulfill some function in the social interaction between the robot 102 and user 150.

A real (as opposed to virtual) social robot 102 may include electro-mechanical components including an electrical circuit configured as a computer housed in an exoskeleton or housing. The circuit may include a central processing unit or units 104, operatively coupled to motor driver controller driving a motor 108, which moves a social expression component 112 comprising a mechanism connected to a head or body portion of the social robot 102, causing the head or body portion to move in a socially significant way. For example, the motor 108 or set of motors may control movement of a head relative to a torso, such as by turning the head around one or more independent axes or moving a robot torso relative to the ground using wheels, treads, legs, or other mechanisms. The processor 104 determines responses and provides motion control signals to the motor driver 108. The motion control signals cause the motor 108 to move the connected body part in conformance with the response selected by the processor 104.

The robot 102 may contain other components for computing in addition to the processor 104. For example, the processor circuit may be coupled to a user interface component (not shown), such as for example a keypad or touchscreen, for entry of user controls. The processor circuit may be coupled to a display component 110, for example a touchscreen or other display. The display 110 may be used for a user interface, as a social expression component 112 to display expressive features of the social robot (e.g., a face), or for both. The processor circuit may be coupled to one or more sensors 114, 116, 120 configured for sensing one or more environmental conditions of the environment around the robots, or of objects that the robot interacts with. The one or more sensors 120 may include, for example, a camera 114, light sensor, microphone 116, temperature sensor, pressure sensor, accelerometer, touch sensor, proximity sensor, or other sensing or Internet of Things (IoT) microelectromechanical sensor (MEMS) device. The processor circuit may be coupled to a communications port 105 for coupling to a computer network, or to a data communication network for receiving data and program instructions. The processor circuit may further be coupled to an audio output transducer (not shown) for outputting robot vocalizations. The processor circuit may further be coupled to a volatile random access memory device 106 for storage of program instructions and data.

The '335 Application referenced above describes a robotic behavior mapping subsystem used in advance of robot operation, to map personal behaviors to social robot behaviors where possible, and to correlate all social behaviors of the robot to a personality scale used for defining the robot's personality profile. The real-time social robot behavior module operates in real time when the social robot is interacting with its live user or users, causing the social robot to express one or more of the personalities. A personality profiling subsystem receives behavioral data for a character or person, and analyzes the data based on a predefined or adaptable personality scale. As used herein, "behavioral data" is limited to data that describes or defines sets of stimulus-response pairs, including but not limited to statistical data regarding relative frequency of occurrence of any particular pair. Stimuli and responses may be described at any desired level of detail, including different levels of detail. For example, a stimulus and response may be generic, such as a stimulus of 'being ignored' and a response of 'seeking to be noticed.' For further example, either or both of the stimulus may be much more specific, such as a stimulus of hearing "How are you?" paired with a response of "What's it to you!?" While behavior may be characterized in any useful manner, it may be desirable to choose stimuli and responses for profiling a character's personality, that can readily be mapped to stimuli that the social robot is capable of detecting, and responses that the social robot is capable of performing. In addition, the behavior should be, or be capable of being correlated to, a social function of the robot. Behavior detection and analysis as described in the '335 Application may be used for assessing user social interaction for purposes of selecting content.

For example, character analysis may be used for mood detection. A character analysis module may produce two outcomes from an analysis process: a list of characteristic social behaviors, and a set of one or more personality profiles, each correlated to a distinct mood of the user. A 'mood' may be thought of as a 'personality mode'; in technical terms each mood is a distinct set of personality trait values that can be observed for continuous periods and to emerge and/or dissipate with at least some predictability in response to one or more mood triggers. A character analyses process may discover a user's moods by grouping stimulus-response data over different continuous time periods, matching similar behavior over different periods, and identifying triggers for time periods in which a distinct mood is observed. The robot 102 may base content selection or determination of other actions in part on a user mood that the robot observes using a process as outlined above.

Figure 2:
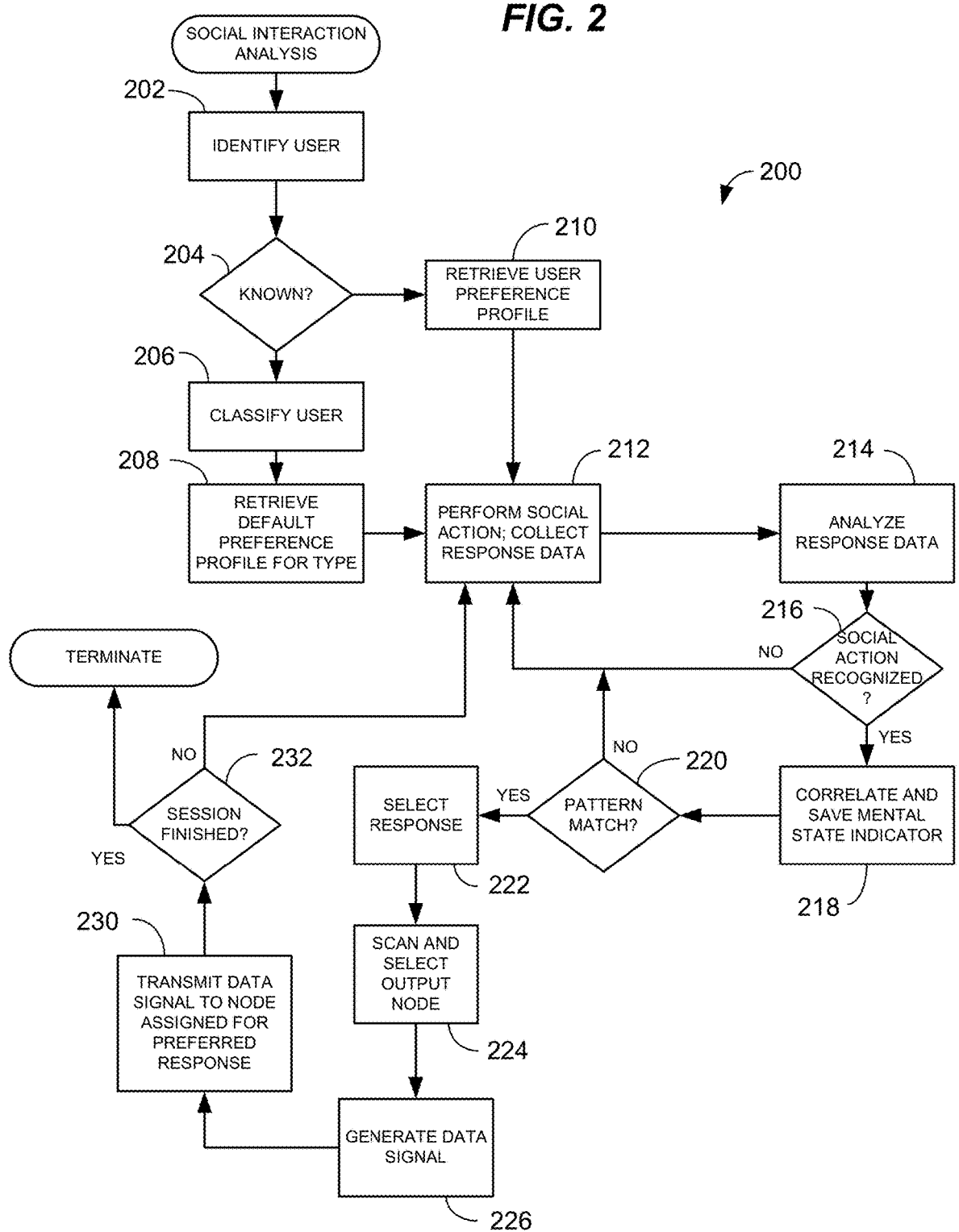
FIG. 2 is a flow chart showing elements of a method by a social robot for selecting recorded digital content or other response based on social interaction with a user.

FIG. 2 summarizes aspects of a social interaction analysis and response method 200 that may be performed by the social robot 102. At 102, which may occur near the outset of a new session, the social robot identifies a user that is interacting with it. For example, the robot may use facial recognition via a camera and image analysis, voice recognition via a microphone and audio analysis, or other biometric identity factors to identify a user that is interacting with the social robot. If the user is not recognized as a particular individual, the social robot may classify the user based on observed demographic clues (e.g., size, age, gender) and retrieve at 208 a default preference profile for the observed demographic type. If the robot recognizes the user, the robot may retrieve a user preference profile at 210. A preference profile may be, or may include, a digital data structure holding a set of symbols (e.g., binary numbers). These symbols indicate in any suitable way user preferences for certain types of recorded content, favorite characters or genres, and other preferences that relate to content or action selection by the robot.

At 212, the social robot performs an action (i.e., a 'stimulus' from the user's point of view). In addition, during and immediately after the action, the robot collects sensor data that indicates a user response to the robot's action. For example, the robot may move relative to the user (e.g., approach, move away, or turn to face) and emit a vocalization in greeting. The robot may also generate a facial expression using a face component. At 214, the robot receives and analyzes sensor data to determine a user response. For example, the robot may receive and analyze audio or video input to determine how, if at all, the user has verbally responded, and any available emotional subtext provided by facial expression or body language that is imaged by the robot's camera or cameras.

The robot stimulus may be matched to a user response, and the resulting stimulus-response pair (representing a social action) is checked against a data structure of recognized matched pairs. If a stimulus-response pair is recognized by matching to a saved pair at 216, the robot may, at 218, correlate the social action to a mental state indicator. The same mental state indicator may be correlated to different stimulus-response pairs. Conversely, the same stimulus-response pair may sometimes be correlated to more than one mental state indicator, but in many cases will correlate to only one indicator. The mental state indicator may be a symbol (e.g., a binary number) that correlates in any useful way to a set of one or more responses that the robot is capable of performing in reaction to a user's mental state.

At 220, the robot determines whether or not it has identified a mental state indicator. If not, it may continue to perform social actions and evaluate user responses at 212. If so, the robot may select one of suitable responses associated with the mental state indicator at 222. At 224, the robot may detect (e.g., by scanning) available output nodes for performing the response. At 226, the robot generates a data signal for an available output node, configured to initiate performance of the response by the output node. At 230, the robot may transmit the data signal to the selected output node, causing the output node to perform a response as described herein. In performing the response, the output node may retrieve a digital copy of video or audio content to be output, either from the robot or from another network node. At 232, the robot may terminate the session if finished or continue social monitoring at 212, if not finished.

FIG. 3 illustrates aspects of a process 300 by a social robot for recognizing a social action, including the aspect that characterization of a robot stimulus or user response can be based on different input data from independent sensor systems. The robot uses sensor data to general various distinctive symbols (e.g., binary numbers) that are associated with particular user responses. For example, recognition of a user response may include a facial recognition process 302 by the robot, based on camera input data. Recognition of a user response may further include, for example, a biometric detection process 304, such as determining a direction of user gaze, a user pulse, or a user skin temperature. Recognition of a user response may further include, for example, speech recognition 306 by the robot analyzing audio data collected by a microphone. Recognition of a user response may further include, for example, recognizing an environmental circumstance or context 308, such as by analyzing photographic data, receiving data from a location beacon or Global Positioning System (GPS) or IoT MEMS, referring to a time-of-day clock, or in any other suitable fashion. Recognition of a user response may further include, for example, determining a relative position and orientation 310 of the robot and the user, such as by using photographic data and proximity sensor data. Other types of user response parameters may also be determined by the robot, as part of social action recognition, if useful.

At 312, the robot may record current recognition in a cache memory 314 and may purge data that is timed out or expired. Similarly, the robot may maintain symbols indicating robot output stimuli in the cache 314, correlated chronologically to detected user responses. At 316, the social robot may filter cached data in the short-term memory 314 using a social action filter. A social action filter may include, for example, a data structure that links stimulus-response pairs recorded in the data structure to respective mental state indicators. At 318, if the robot detects a match, it may at 320 output a mental state indicator. The mental state indicator may be a symbolic (e.g., binary) value that has a specific correlation (e.g., one-to-one or one-to-many) to a set of social action data, as determined by the social action filter. It should be apparent that the phrase "mental state" in "mental state indicator" is merely a term of convenience and does not limit the manner in which the indicator is derived or used. As described, the indicator is a machine-determined symbolic value based on social interactions and context known to, or detected by, the robot, and need not correlate to the user's actual mental state. However, in a well-designed implementation, the mental state indicator may, and generally should, correspond to a user's mental state insofar as that mental state relates to social actions that the user is likely to be receptive to. The described processes for generating a mental state indicator and selecting a social response exemplify processes for emulating human empathy as expressed by social actions. At 322, the robot may terminate the session if finished or continue symbol generation at 324, if not finished.

FIG. 4 illustrates aspects of a social action filter parameter set 400 for use in connection with the method 300, organized in a tabular data structure. The illustrated parameter set 400 includes different symbolic values (e.g., binary numbers or character strings) in different data categories. Each of the values corresponds to a social action with semantic meaning. For example, a 'facial expression' category 402 may be populated by one or more values correlated to social actions such as neutral expression, smile, grin, and laughing. An 'other biometric' category 404 may be populated by one or more values correlated to social actions such as standing, walking, and pulse in intermediate range. A 'speech' category 406 may be populated by one or more values correlated to verbal communication such as laughing, or any of the words funny, riot, hilarious. An environmental circumstances' category 408 may be populated by one or more values correlated to social circumstances such as morning, workday, bright, or at home. A 'robot-human relational status' category 410 may be populated by one or more values correlated to relative positions such as closer than some distance 'x', or facing each other. The illustrated categories and values are merely examples to illustrate underlying concepts, without limiting the method 300 to these examples. The parameter set 400 for the social action filter may include Boolean logic between different symbolic values, for example, a logical "AND" requiring at least one value from any of the categories 402, 404, 406, 408 or 410 to be present and a logical "OR" between any values in the same category, thus finding a match if any one or more values from each category is present. Other logical arrangements may also be suitable.

A robot may apply many distinct social action filter parameter sets to find one or more mental state indicators. In an aspect, the filter parameter sets may be configured such that some combinations of social actions will correlate to different mental state indicators. When the robot discovers more than one matching mental state indicator, it may select one of the indicators for governing a response using any suitable process, for example, random selection, quasi-random selection, weighted order based on past selections (e.g., "taking turns"), or basing the selection on further information (e.g., asking the user, or referring to additional information such as user preferences, trending popularity, or a robot 'mood'). In an alternative, if multiple mental states are indicated, the robot may elect to defer its response.

Figure 5:
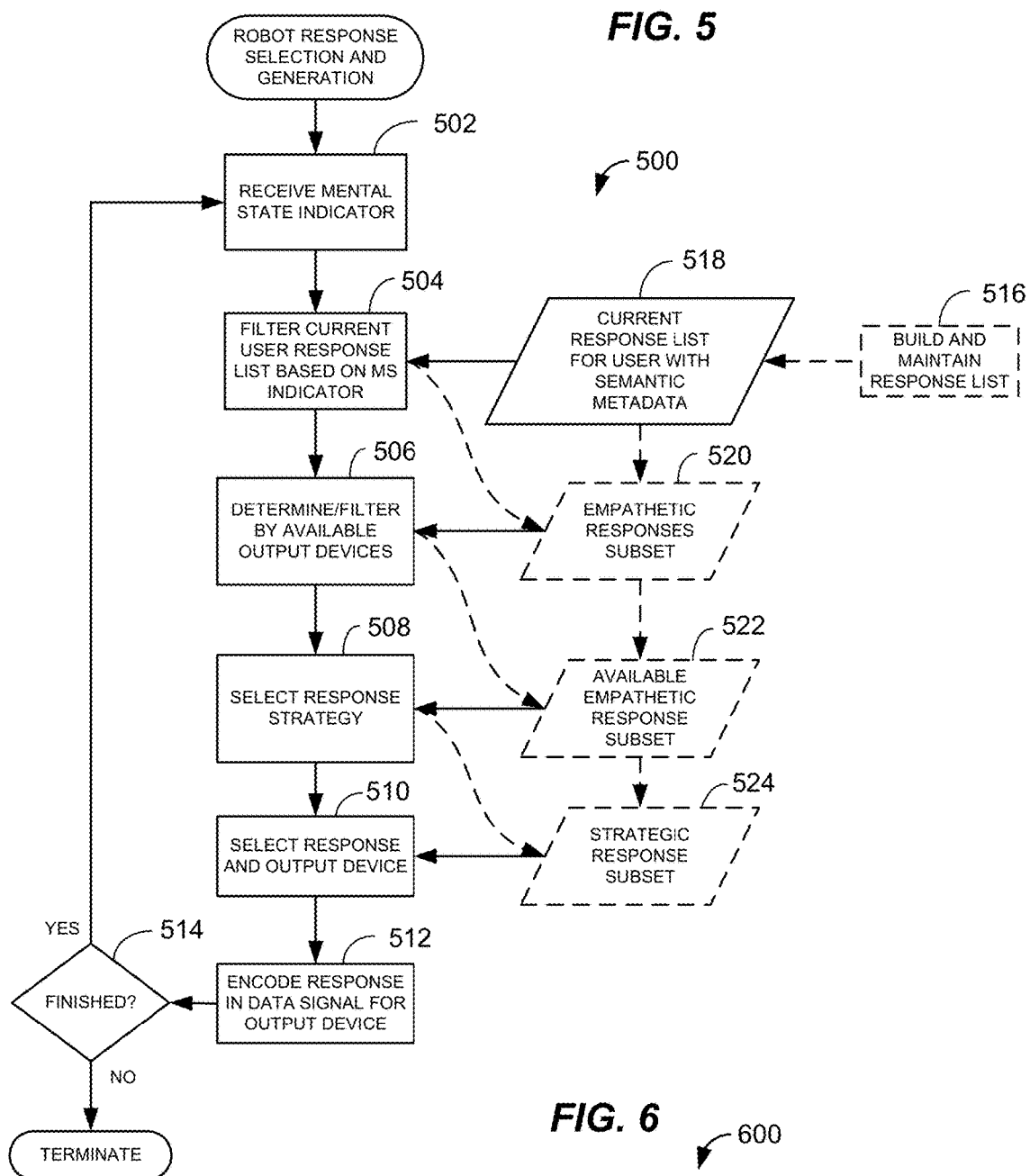
FIG. 5 is a flowchart showing aspects of a method by a social robot for selecting and generating an environmental control output based on symbolic output indicating a mental state from a process such as diagrammed in FIG. 3.

FIG. 5 shows aspects of a method 500 by a social robot for selecting and generating an environmental control output based on symbolic output indicating a mental state from a process such as, for example, the method 300. At 502, the robot receives or derives a metal state indicator, in the form of a symbol compatible with the robot's processing system, for example a binary number that falls within a range of values that are reserved by the robot's response selection algorithms for selecting from available response options. At 504, the robot filters a current response list 518 for the user, based on comparing the mental state indicator with semantic metadata that is independently associated with each entry in the response list. The current response list 518 may be built and maintained by a background process 516 that operates on the robot and/or other nodes of the network that are in communication with the robot. The list 518 may include every possible response that the robot is capable of, excluding responses that are barred by security, safety, or user preference settings. In an alternative, the list 518 may include a lesser subset of the full set, for example for reducing bandwidth or data storage requirements, for ensuring that fresh responses are used, or for creating a chronological association with certain responses.

Figure 6:
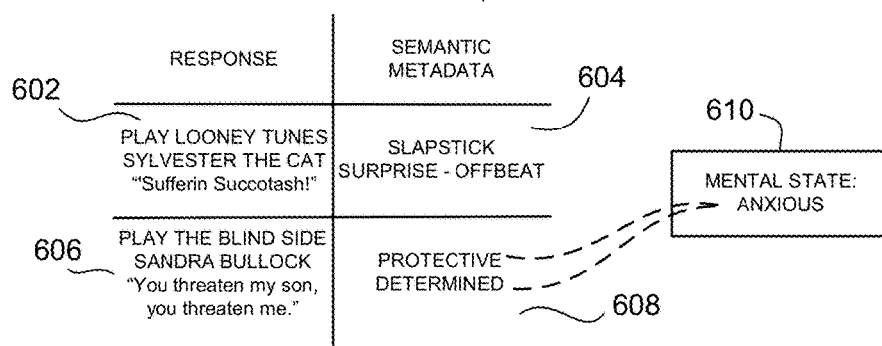
FIG. 6 is a table illustrating use of semantic metadata for selecting digital content based on a mental state indicator.

Before continuing with description of FIG. 5, consider how the social robot makes use of semantic metadata. FIG. 6 illustrates a response list for enabling use of semantic metadata 600 for selecting digital content based on a mental state indicator. It should be appreciated that the semantic metadata 600 is expressed at the machine level as a machine-readable symbolic value, for example, as a binary value in a range reserved for expressing semantic concepts. The machine-readable symbol is one-to-one associated with a human-readable symbol (e.g., a word or phrase as illustrated in FIG. 6) via a database or other data structure, for example for use in an administrative interface, or in an application for crowd-sourcing assignment of semantic metadata to response actions. For illustrative simplicity, the table shown in FIG. 6 has only two records, a first record in which a response 602 (play Looney Tunes Sylvester the Cat saying "suffering succotash!") is associated with semantic metadata 604 (corresponding to the human-readable symbols "slapstick" and "surprise-offbeat"), and a second record in which a response 606 (play The Blind Side where Sandra Bullock says "You threaten my son, you threaten me") is associated with semantic metadata 608 (corresponding to the human-readable symbols "protective" and "determined"). It should be appreciated that a response list will often include many more entries than two, and that response entries in the table may include other environmental control actions besides "play content 'X'", for example: "open the blinds," "turn down the lights," "brew a cup of chai," and so forth.

A mental state indicator 610 (with corresponding human-readable symbol "anxious") is correlated to the semantic metadata 608 as indicated by the dashed lines and is not correlated to the semantic metadata 604. Accordingly, in the filtering process 504, a robot may exclude the first response 602 and include the second response 606 in the filtered empathetic responses subset 520. Correlations between semantic metadata 600 and mental state indicators (e.g., indicator 610) may be recorded in various ways. For example, the semantic metadata 600 may be expressed as a set of numeric values, in which each numeric value indicates a value in a range between bipolar opposites for a particular mental state indicator. Suppose, for example, that a robot makes use of 100 different mental state indicators, then each response action would be associated with 100 or less different values each consisting of the numeric value and an index number for the mental state indicator (or the mental state indicator itself) to which the score relates. Continuing the example, a range from −31 to +31 may be indicated by a six-digit binary number, wherein −31 indicates the strongest possible negative correlation, +31 indicates the strongest possible positive correlation, and zero indicates no correlation (e.g., irrelevant or not applicable). Each response action in this example would be scored against one or more of the mental state indicators, with unscored indicators assigned a default value of zero, using a human administrator and/or crowd-sourced data or other metric. Use of numeric score enables the robot to rank responses by score, and thereby increase the probability of selecting a response that is most relevant to any given mental state indicator.

In addition, bipolar scores for semantic relevance may be scored in different dimensions (or axes) for different response strategies. For example, one strategy may be 'to express sympathy and support.' Another might be 'to present an alternative point of view' (e.g., to argue); still another might be 'to inject humor,' as so forth. Each response may be assigned a separate score based on the applicable strategic axis. For example, given the mental state 610 relating to anxiety, the response 606 might score strongly positive for 'sympathy and support' and neutral or zero for 'argue' or 'make a joke.' Development of such scores is necessarily subjective and sensitive to cultural factors, and so may be a good candidate for crowd sourcing, such as by distributing and collecting data via user surveys or using focus groups.

Referring again to FIG. 5, given the subset 520 of empathetic responses, the robot may apply a second filter 506 based on available output devices. For example, some player devices or appliances needed to complete a response may not be available or appropriate (e.g., based on user settings) at the time the response is needed. Therefore, the robot may eliminate responses that require use of an inactive output device, deriving an actual or constructive second subset 522 that includes only available empathetic responses.

At 508, the robot may select a response strategy, provided that the semantic data associated with the responses in the subset 522 enable differentiating between the relevance of particular responses for different response strategies, given any particular mental state indicator. Examples of various response strategies and an associated scoring system have been provided in the paragraphs above. At the machine level, each response strategy may be implemented as a branch or variable that causes the selection of response to be based exclusively or predominantly on a subset of the semantic metadata that relates to the response strategy selected by the robot. The selection 508 of response strategy may be based on random or quasi-random factors, such as a robot mood, or may be based on more deterministic factors such as a strength or clarity score associated with the mental state indicator, recent past mental state indicators in present the user session, user preference settings, or other factors. Once the robot selects a strategy, the available empathetic responses 522 may be filtered or ranked based on the semantic metadata for the selected strategy. This derives an actual or constructive third subset 524 that includes only strategic available empathetic responses.

At 510, the robot selects one or more of the remaining responses in the subset 524. Selection from the subset 524 may be done using random or quasi-random factors, so that robot behavior is not deterministic while still remaining strategic and empathetic. In an alternative, or in addition, the selection may be done using a deterministic approach, such as by choosing the highest entry in a list ranked by a semantic value score. The robot may select different responses for different output devices, such as, for example, dimming the room lights via a home control unit and playing a romantic clip on a home entertainment center or vehicle sound system or entertainment system. At 512, the robot encodes instructions for causing the selected response in a data signal, for each output device involved in creating a selected response. The robot then transmits the data signals to the computer network for delivery to each involved device, either directly or through an intervening service node (e.g., server 134). At 514, the robot may terminate the session if finished or continue to the next mental state indicator at 502, if not finished.

Figure 7A:
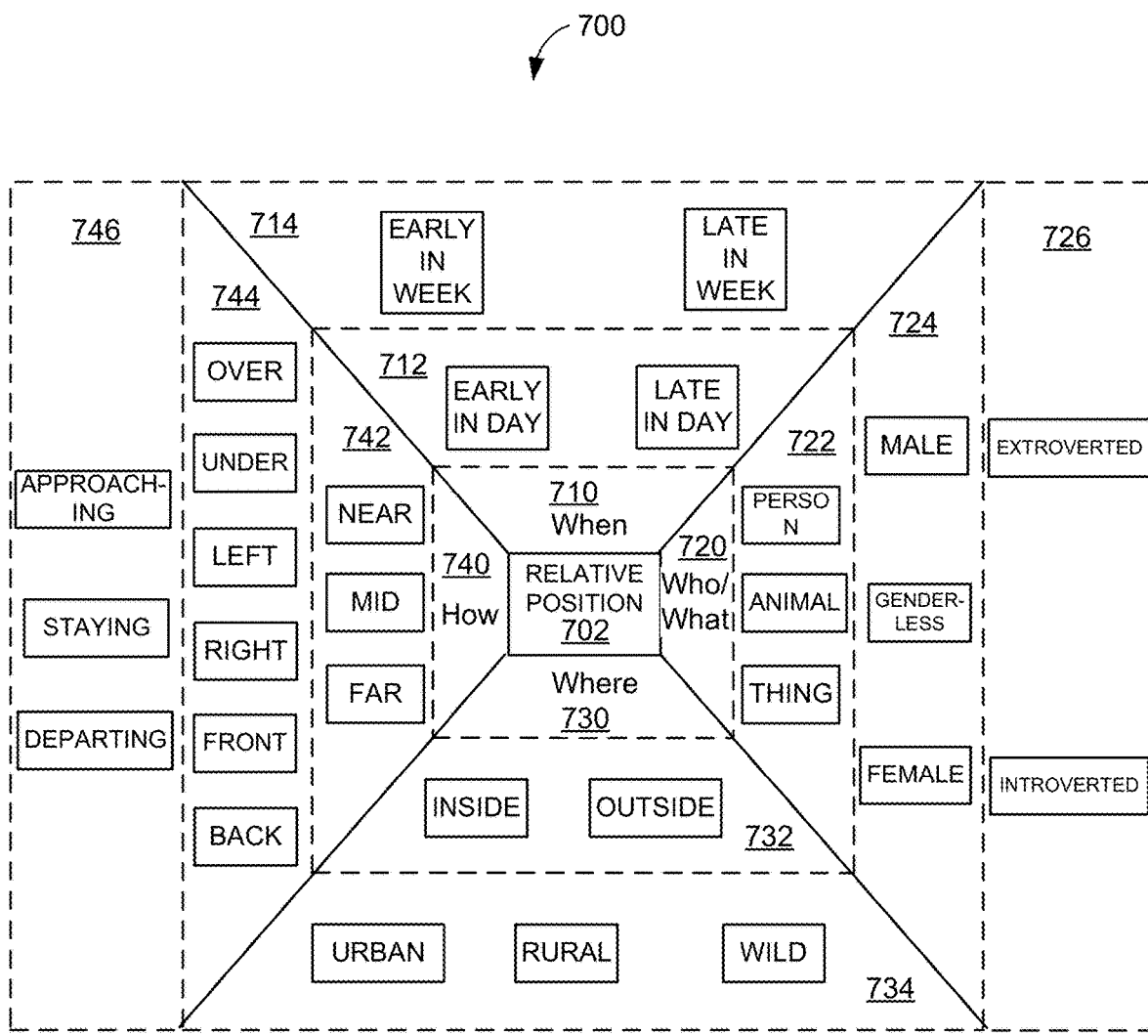
FIGS. 7A and 7B are concept diagrams illustrating aspects of quantifiable stimulus and response parameters, respectively, which paired together can be used to define a social behavior numerically.

As described in more detail in the '335 Application, social behavior may be characterized by stimulus-response symbol pairs. FIG. 7A provides an example of multiple parameters that define a stimulus, and a system 700 for organizing the stimulus parameters in logical categories arranged in groups. Organization of stimulus parameters may be useful for associating semantic meaning to stimulus-response pairs, and hence, to selecting mental state indicators based on such pairs. While the '335 Application taught numeric methods for deriving a personality score, the present disclosure points out how the same or similar methods may be used to obtain a mental state indicator for use in the processes outlined above.

A top-level category 702 defines the stimulus at the highest useful level of generality. In the illustrated example, the stimulus is a relative position between the robot or character and something else. The remaining parameters can be organized in any number of sublevels. Here for example, the parameters are organized into four groups: a time (when) group 710, an identity (who/what) group 720, a location (where) group 730, and a manner of performance (how) group 740. Each of the groups contains a score between bipolar opposites of a sort. For example, the time group 710 may contain a time-of-day score 712 and a day-of-week score 714, indicating when the stimulus occurs. Each of these scores may be normalized to a numeric score that runs continuously between the endpoints of the chosen scale. For example, if an eight-bit scale is used for a time-of-day parameter 712, each 24-hour period from just past midnight until midnight of the following day may be divided into 128 equal incremented, enabling timekeeping to a granularity of 128/24 (5⅓ units per hour, or 11.25 minutes. This should be more than enough granularity for correlating social responses. Using the same eight-bit scale to denote time over days of the week results in 7 times less granularity, or 78.75 minutes, while enabling mood or other response correlations to days of the week. For further examples, an identity group 720 may include values measuring characteristics of the person or thing that is positioned to cause the stimulus, for example, a person/thing scale 720, a gender scale 724, and an extroversion scale 726. Likewise, a location group 730 relates where the stimulus occurs, for example an enclosure parameter 732 and a neighborhood character parameter 734. For further example, a manner of performance parameter group 740 may include a proximity measure 742, one or more orientation measures 744 and a relative motion measure 746.

The system 700 is simplified for illustrative purposes, and the specific measures included in the parameter examples are less important than the principles of organization and quantification that have been described. Under the illustrated principles, any given stimulus can be represented as a matrix of measurement values. For example, each group can provide a row of the stimulus matrix and each column may delineate between adjacent parameters, or vice versa; the matrix may have any useful number of dimensions. A matrix with one or two dimensions is believed useful; higher dimensions increase complexity but may also be useful. Each cell of the matrix may hold an eight-bit (or other) numeric value, the meaning of which depends on the system 700. It should be appreciated that using a standard system for different stimuli would enable rapid machine comparisons and correlations between different stimuli and their associated responses. The particular meaning associated with each cell is not critical, but the value of the cell should have a material impact on the response in at least some cases, or else the parameter is not worth tracking. Accordingly, a general stimulus organization system 700 may be organized to enable use of a standard matrix for all stimuli of interest, while maximizing the impact of each cell value on the associated social response.

Figure 7B:
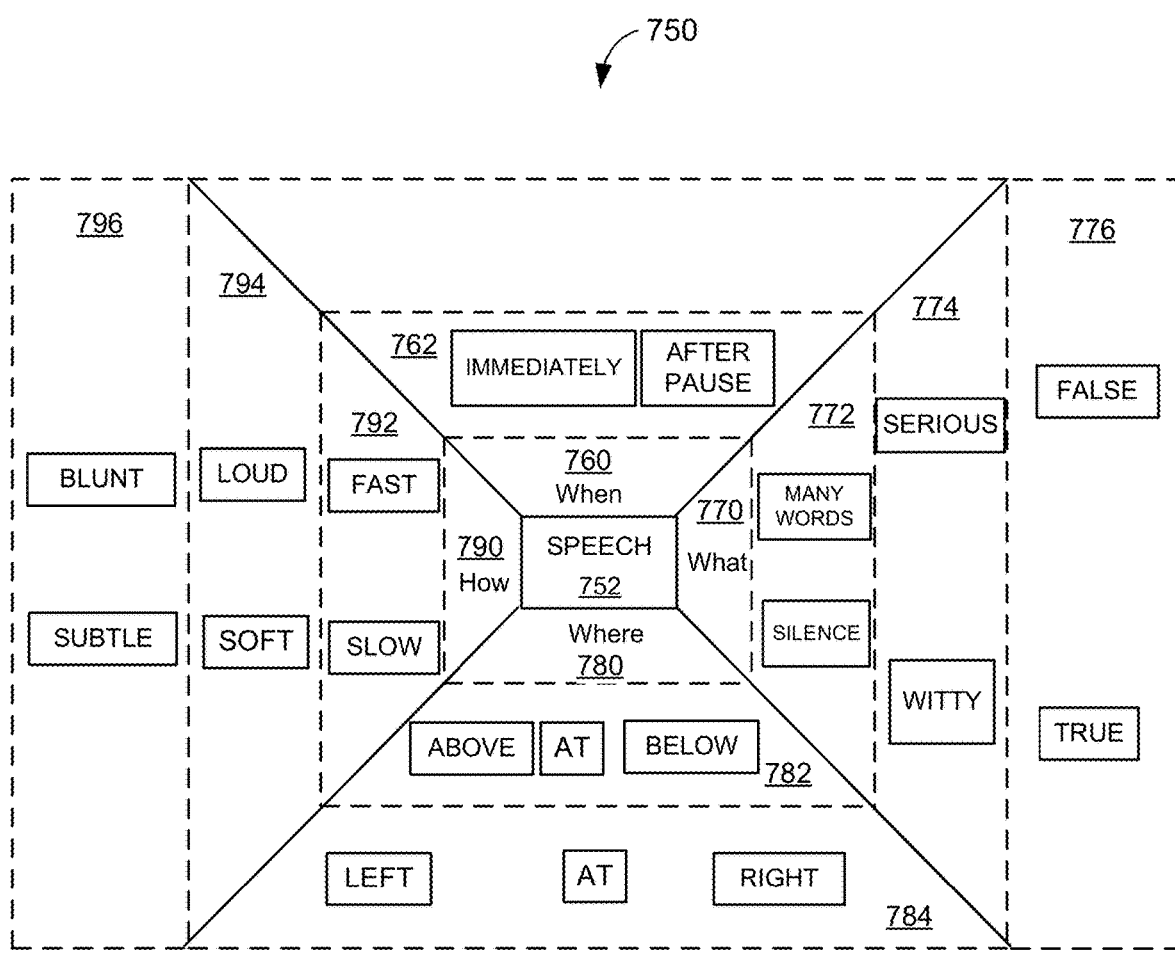

FIG. 7B shows the same organizing and quantification principles applied to system 750 for characterization of a social response. In this example, the top-level category 752 pertains to speech. The time group 760 does not pertain to time of day, etc., because that aspect is controlled by when the stimulus occurs. The main time parameter 762 pertains to how quickly the speaking response is made after the stimulus is received. The identity group 770 may contain numeric measures of the speech content, such as the length of speech 772, its humorous character 774, its truth 776, and so forth. The actual words spoken cannot readily be represented numerically in the organization scheme illustrated by FIGS. 7A-B. Instead, for a character that uses distinctive stock phrases, each stock phrase can be scored based on the combination of content identity parameters in the group 720, and thereby identified by score comparison when socially appropriate for the personality being exhibited. The position group 780 may contain parameters 782, 784 that relate the direction to which the speech is addressed relative to the person or thing being addressed, or that relate to turning away from the person or thing being addressed if an oblique response directed away (e.g. turning away and shaking its head) is deemed more appropriate. A manner of performance parameter group 790 may include a pacing parameter 790, a volume parameter 794, and a subtlety parameter 796. Similar organizational principles may be used for stimulus systems (e.g., 700) and response systems (750), but in both cases care should be taken that the measurement parameter for a stimulus does not more truly relate to the response, and vice-versa.

Figure 8:
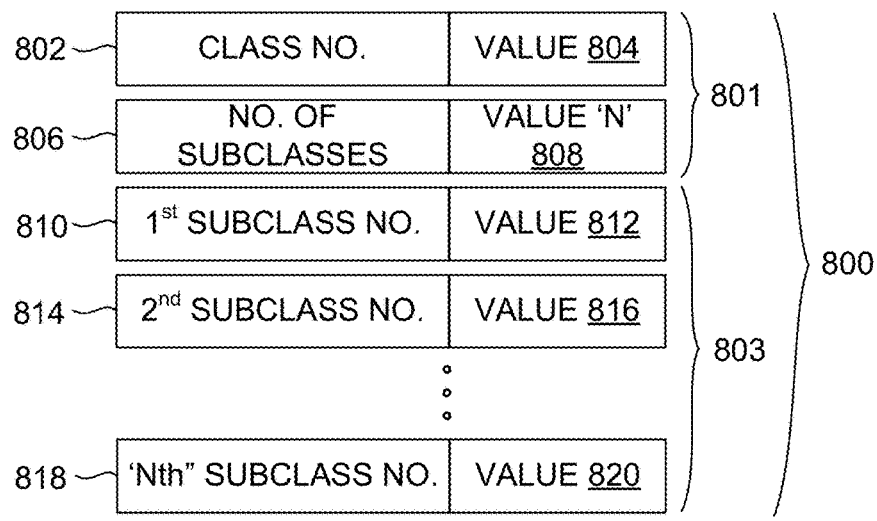
FIG. 8 is a table illustrating aspects of a data structure for representing a stimulus or response numerically.

FIG. 8 illustrates aspects of a flat data structure 800 for holding quantified multi-parameter data for stimulus or a response. A header 801 may include an identifier 802 for a top-level stimulus or response category. The header 801 may further include an indication 806 of the total number ('N') 808 of subclasses used in the data structure 800. Each subclass identifier 810, 814, 818 may correlate to a parameter group as described above. The header 801 may be followed by a list of values 812, 816, 820 that may each define several distinct parameters that may be distinguished by bit position. Parameters within the group may be specified by a predetermined number of bits in the numeric values 812, 816, 820 in a predetermined order. The data structure 800 comprises a string of digital values with sufficient index information to make use of the string.

Figure 9:
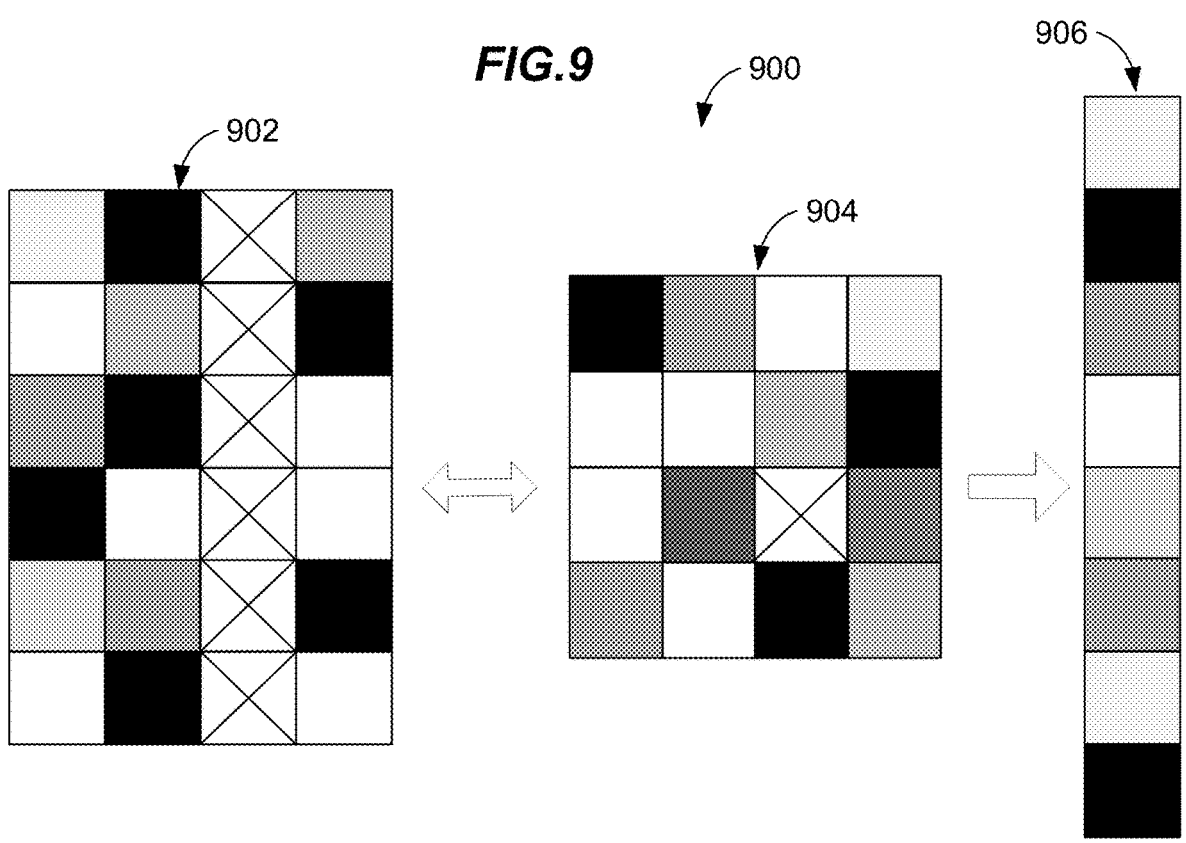
FIG. 9 is a concept diagram providing a graphical illustration of a 4×6 numeric stimulus value paired to a 4×4 numeric response value, wherein the illustrated stimulus-response pair (a behavior) correlates to a single 1×8 numeric mental state indicator for the behavior.

FIG. 9 illustrates graphically a system 900 in which a 4×6 numeric stimulus value 902 is paired to a 4×4 numeric response value 904. In addition, the illustrated stimulus-response pair 902, 904 correlates to a single 1×8 numeric mental state indicator 906 for the pair, based on any useful scale. In the illustrated example, black indicates a maximum value, white represents a minimum value, gray represents some intermediate value, and "X" represents a null (inapplicable) value. Each cell or box represents a parameter value for a stimulus or response. Hence, the system 900 illustrates how a particular mental state indicator 906 can be correlated to one or more numerically represented stimulus-response pairs, using purely numerical methods. For example, given a large set of many stimulus-response pairs all numerically represented under a consistent scheme, a processor may determine a correlation coefficient between each cell of the stimulus matrix and each cell of the response matrix. For each cell of the stimulus matrix, the processor may determine the most positively correlated response parameter and the most negatively correlated response parameter, over the entire behavior set, using a measure such as, for example, a Pearson's correlation coefficient. For example, the value of the stimulus parameter at row-column (1, 1) may correlate most positively with the response parameter at (1, 4) and most negatively with the response parameter at (2, 2). If so, the first two values of the mental state indicator 906 for the stimulus response pair 902, 904 as a whole may indicate the value of the correlation. For example, the amount of positive correlation (e.g., a number between 0 and 1) may be indicated by seven binary digits plus one digit to indicate the sign (positive or negative), while the amount of negative correlation can be indicated using the same scheme. If this is repeated for every stimulus value, a numeric mental state indicator for the stimulus-response pair can be determined without any need for a human to assess stimulus-response pairs qualitatively. This may be done for every distinct set of stimulus-response pairs identified with a particular user, to provide a custom set of mental state indicators for the user. In an alternative, or in addition, stimulus-response data from different users may be aggregated to provide aggregate mental state indicators. The meaning of a purely numerically defined mental state indicator will, unlike a predetermined standardized scale, depend on the stimulus-response from which it is derived and the numeric method used to derive it. So long as the numeric method reflects a rational measure of correlation between stimuli and responses for the behavior set, a numerically derived mental state indicator should work just as well if not better than one derived by more qualitative methods.

A quantitative mental state indicator that is defined using a purely automated, numeric process may not have any meaning that can easily be expressed in words, unlike the examples described herein above. The automatically determined indicator nonetheless enables a social robot to select appropriate responses, because the indicator will capture the most important correlations between stimuli and responses. Consider, for example, how a numerically determined mental state indicator derived from a particular stimulus-response pair (902, 904) works in associating with semantic metadata as described in connection with FIG. 6. The mental state indicator will need to be scored relative to semantic metadata as before. However, scores can be interpolated between selected key mental state indicators. For example, if a particular mental state indicator is believed to indicate an 'anxious' mental state particularly well, it may be designated as a 'key' value for an anxious mental state. Then, semantic association scores for any similar mental state indicator can be interpolated between the indicator's closest key value and its nearest key neighbors.

For multi-factor mental state indicators, different factors may be more or less relevant to different response strategies, because each factor relates to a particular stimulus/response factor. Some stimulus/response factors are more relevant to certain response strategies than to others. For example, a 'mirroring' factor, measuring how well the user is mirroring the social robot's actions, may be positively correlated to a strategy of expressing sympathy and negatively correlated to a strategy of providing a contrasting opinion. The semantic association scores can therefore also be interpolated between different key mental state indicator values for different strategies, as previously described. Advantageously, use of a numerically determined measure for a mental state indicator may facilitate numeric determination of associations to semantic metadata, reducing the need for human involvement.

In general, whether or not a mental state indicator is derived purely numerically or is based on some human-comprehensible symbol, scoring any particular stimulus-response pair based on the applicable scale should enable a social robot to later identify a proper subset of all of the robot's social behaviors containing only those behaviors within a desired degree of similarity (e.g., plus or minus 10%) of a specific personality profile for the current character and mood, or that are flagged as being part of the behavior set from which the current personality profile was developed. Regardless of how the personality profile is developed, operation of the social robot in real time is always fully automated based on algorithms programmed into the robot's control processor(s).

Figure 10:
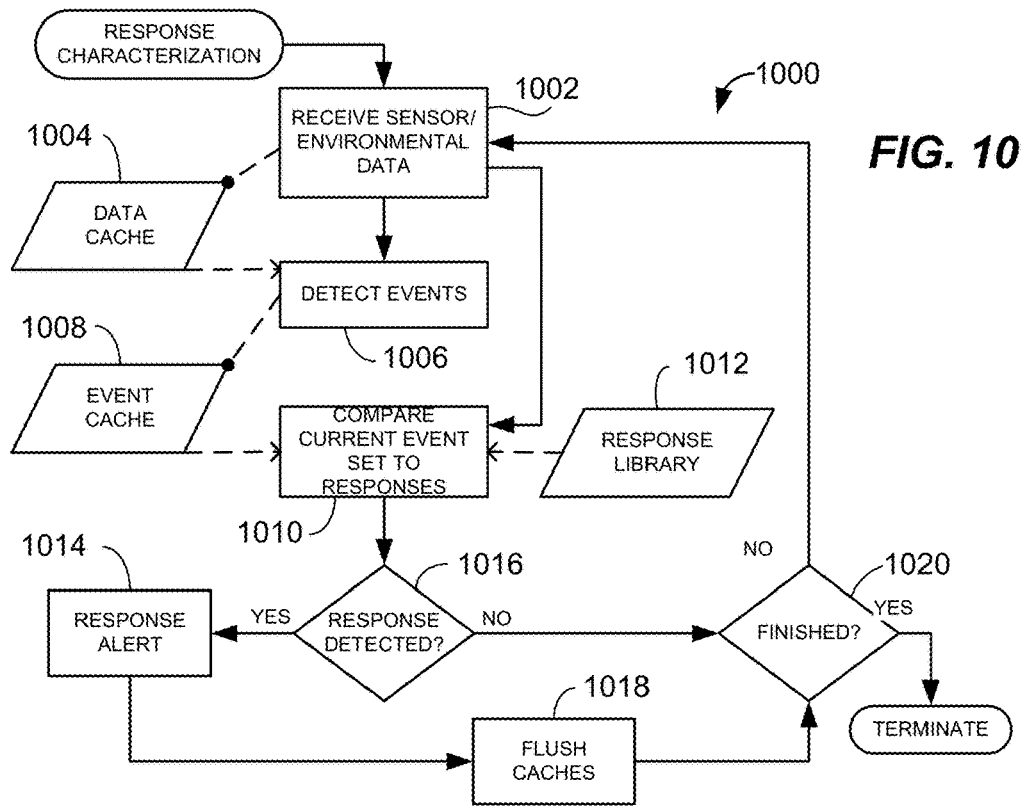
FIG. 10 is a flowchart showing aspects of a method and system for characterizing a stimulus, in real time for operation of a social robot, wherein the stimulus correlates to one or more responses based on one or more personality profiles in use for controlling the social robot.

An example of a process 1000 for response characterization is diagrammed in FIG. 10, for performance by a processor of a social robot. Response characterization facilitates the creation of stimulus-response pairs from for mental state indication. At block 1002, the processor receives sensor data (if a real social robot) or modeled environmental data (if a virtual social robot) via a data stream or file, and records the received data in a cache memory 1004. At 1006, the processor analyzes data from the cache and detects one or more user events, using any suitable event detection method as known in the robotic arts. The events detected are social events generated by the user, for example, smiling, turning to face the robot, turning away from the robot and muttering, and so forth. The processor places identifiers for the detected events in an events cache 1008. In parallel to the event detection 1006, the processor compares 1010 contents of the current event cache 1008 to the robot's user response library 1012 in a computer memory, which contains all user responses associated with any defined social stimuli output by the robot. If no response is detected 1016, the process loops back to block 1002 until operation of the social robot is finished at 1020. If a response is detected at 1016, the processor signals an alert 1014 that indicates an identifier for the detected response for use in building a current stimulus-response pair. Ignoring the robot may be a social response or may be unintended. Therefore, the lack of a response may be identified as an 'intentionally ignoring' response if the stimulus and environmental conditions are such that it is likely to be intentional. The robot is itself responsible for producing the related stimulus, so may respond to the alert by recording the occurrence of a particular stimulus-response event. Once the alert is provided at 1014, the processor flushes 1018 the caches 1004 and 1008, and the process 1000 loops back to block 1002 until operation of the social robot is finished.

Figure 11:
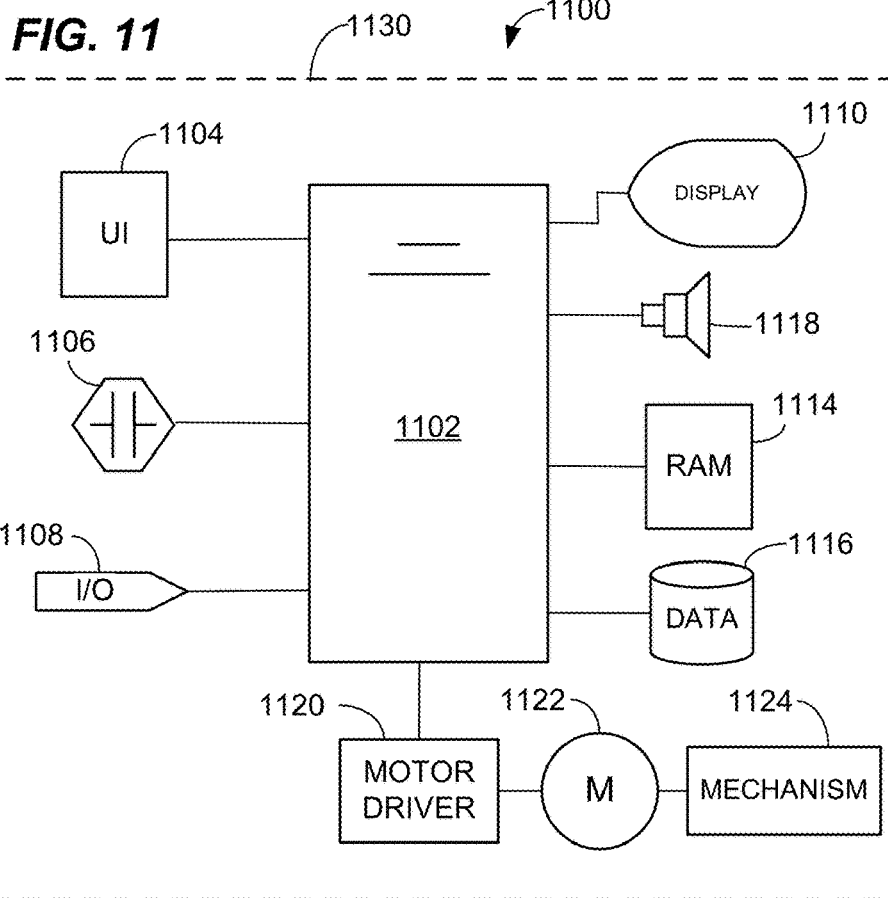
FIG. 11 is a block diagram showing aspects and components of a real social robot.

Each of the foregoing methods may be implemented as modules in, or processes by, a real social robot 1100 for example as shown schematically in FIG. 11. The social robot 1100 may include electro-mechanical components including an electrical circuit configured as a computer housed in an exoskeleton or housing 1130. The circuit may include a central processing unit or units 1102, operatively coupled to motor driver controller 1120 driving a motor 1122, which moves a load comprising a mechanism connected to a head or body portion of the social robot 1100, causing the head or body portion to move in a socially significant way. The processor determines responses and provides motion control signals to the motor driver 1120, based on a behavioral response selected as described herein above. The motion control signals cause the motor 1122 to move the connected body part in conformance with the response selected by the processor 1102.

The robot 1100 may contain other components for computing in addition to the processor 1102. For example, the processor circuit may be coupled to a user interface component 1104, such as for example a keypad or touchscreen, for entry of user controls. The processor circuit may be coupled to a display component 1110, for example a touchscreen or other display. The display 1110 may be used for a user interface, to display expressive features of the social robot (e.g., a face), or for both. The processor circuit may be coupled to one or more sensors 1106 configured for sensing one or more environmental conditions of the environment around the robots, or of objects that the robot interacts with. The one or more sensors 1106 may include, for example, a camera, light sensor, microphone, temperature sensor, pressure sensor, accelerometer, touch sensor, proximity sensor, pulse sensor, gaze direction sensor, or other sensing or IoT MEMS device. The processor circuit may be coupled to a communications port 1108 for coupling to a computer network, or to a data communication network for receiving data and program instructions. The processor circuit may further be coupled to an audio output transducer 1118 for outputting robot vocalizations. The processor circuit may further be coupled to a volatile random access memory device 1114 and to a non-volatile memory 1116 for long term storage of program instructions and data.

Figure 12:
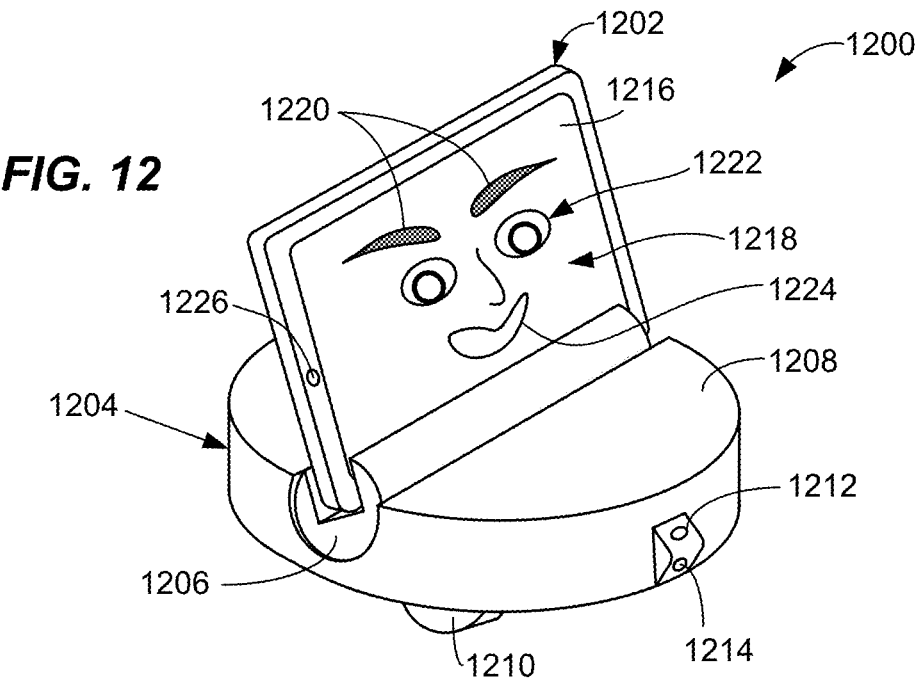
FIG. 12 is an isometric view showing an example of a real social robot.

An example of a real social robot 1200 is shown in isometric view in FIG. 12. The social robot 1200 comprises an assembly of a smartphone 1202 (or similar computing and wireless communication device) with a mechanical base. The smartphone 1202 couples via a wired or wireless interface to a power and control circuit in the base 1204. Separately or together, the smartphone 1202 and base unit 1204 include an electronic substrate holding one or more processors coupled to a memory and to at least one circuit for driving components of the robot. A circuit in the base unit may be similar to the circuit described in connection with FIG. 11, minus a touchscreen display which is supplied by the smartphone. The circuit in the smartphone may also be similar to the circuit of FIG. 11, minus the motor and motion components. Together, the base unit and smartphone comprise a circuit with all of the components depicted in FIG. 11. For example, the robot's sensors may include a camera 1226 mounted in the body of the smartphone 1202.

In some embodiments, the main processor and application for controlling operation of the social robot is located in the smartphone 1202, with a processor in the base unit 1204 operating as a slave or client system. In alternative embodiments, the main processor and application for controlling operation of the social robot is located in the base unit 1204, with the smartphone 1202 playing a client or slave role. The dual device, modular construction provides an advantage of enabling a commonly available, versatile device (the smartphone) to supply many necessary components of the robot 1200, while still allowing it to be used as a smartphone at other times. Nonetheless, the methods herein for controlling real social robots apply equally well to modular and unitary designs for robots.

In the robot 1200, a face component comprises the display screen 1216, displaying human-recognizable expressive features 1218 controlled by the smartphone processor, including a configurable brow 1220, a configurable pair of eyes 1222, and a configurable mouth 1224. These components may be animated based on a personality profile for a character to be emulated. The screen 1216 and smartphone audio transducer may also be used to output an environmental response, for example playing a selected audio-video clip. The robot 1200 also includes wireless communication features through which it may send data signals for controlling environmental nodes in response to the user's social behavior, as described in more detail herein above.

The robot 1200 further includes a movable head component coupled to the face component. The moveable head component includes the smartphone 1202. While the robot 1200 lacks a humanoid torso or appendages, these may be added if desired. The movable head (phone 1202) itself may be controlled at least in part by a processor in the smartphone 1202, while movement of the base unit 1204 and its included rotating 'neck' component 1206 may be controlled at least in part by a processor in the base unit 1204, that is in communication with the processor in the smartphone 1202.

The robot 1200 may further include an audio output transducer (not shown) coupled to a control circuit of the smartphone 1202. In the alternative, or in addition, an audio output transducer may be located in the base unit 1204. Either or both audio output transducers may be used for the robot's social vocalizations. An audio transducer may also be used as a component of a proximity sensing sonar system.

The base housing 1208 may be configured as a torso component coupled to the head component (smartphone 1202) via a neck mechanism 1206 controlled by one or more processors in the base unit 1204. The neck mechanism 1206 permits rotation of the head component 1202 relative to the torso component 1208. The torso component (housing) 1208 may connected to a control circuit via motor and motor drivers located inside the base housing 1208. The base housing 1208 may be supported by wheels or casters (one shown at 1210), at least one of which is driven by a motor under control of the robot's central processor, and at least one of which can be steered. Accordingly, the housing 1208 can move and rotate over any navigable hard surface. The 'head' 1202 can also turn to face any user, person, or object in the area, being provided with two degrees of rotational freedom by the neck and torso components 1206, 1208.

To prevent collisions or falls, a pair of proximity sensors 1212, 1214 and/or the camera 1226 may provide navigation data to a navigational engine executing in a processor of the robot. The navigational engine may limit or alter movement of the movable torso 1208 and neck 1206 to prevent collisions and falls, while otherwise providing output motion in conformance with requested social behaviors.

To that end, a computer memory of the robot 1200 may hold program instructions, that when executed by its one or more processors, causes the social robot to provide an empathic environmental response (e.g., playing a video clip) to the user's social interactions with the robot, and to perform more detailed operations as described herein.

The empathic environmental control techniques described herein may be applied equally well to virtual social robots, which can interact socially with a user in a virtual environment and communicate with network nodes in the user's real or virtual environment. Hence, a virtual social robot may implement any of the detailed operations described herein that do not require actions by a physical robot.

Figure 13:
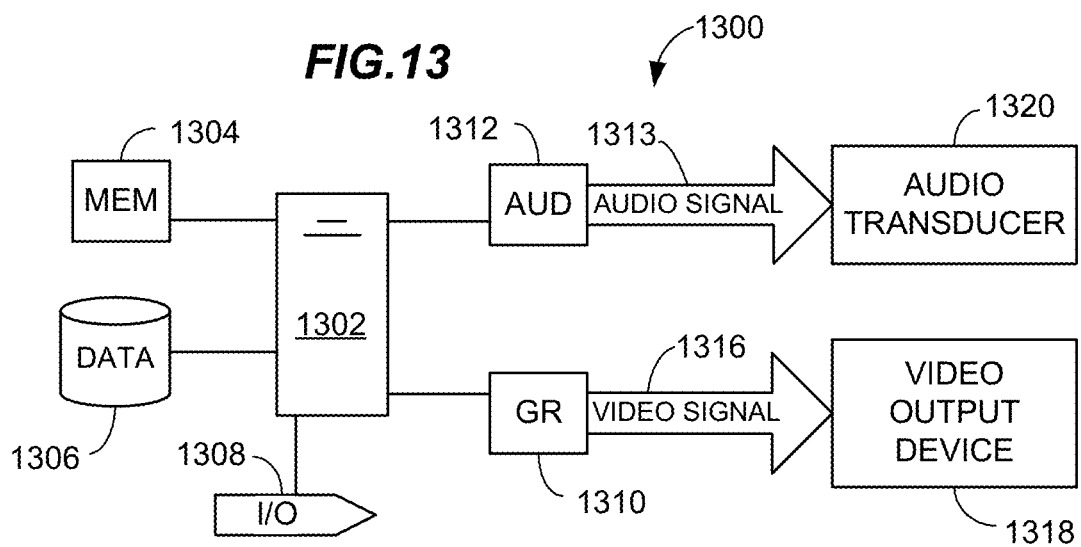
FIG. 13 is a block diagram showing aspects and components of a virtual social robot.

For example, FIG. 13 shows hardware components of a virtual social robot 1300, in block diagram form. The virtual social robot 1300 includes a control processor 1302, that may be used to generate the virtual environment and the virtual social robot in it, or that may be dedicated exclusively to the social robot or to the social robot and some limited part of its virtual environment. The processor 1302 may be coupled to a short-term memory 1304 (e.g., RAM) enabling execution of program instructions, and a non-volatile data store 1306 for long-term storage of virtual data and program instructions. The processor 1302 may be coupled to a communications port for sending and receiving data via a data communications or computer network.

The virtual social robot 1300 may be expressed via at least two outputs: audio and video. The social robot 1300 may include an audio driver component 1312 coupled to the processor 1302, producing an audio signal 1313 for providing to an audio output transducer 1320. The social robot 1300 may also include graphics driver component 1310 coupled to the processor 1302, producing a video signal 1313 for providing to a video display device 1318. The virtual social robot 1300 may hold program instructions in the memory 1304, that when executed by the processor 1302, causes the social robot to provide an empathic environmental response (e.g., playing a video clip) to the user's social interactions with the robot, and to perform more detailed operations as described herein.

Figure 14:
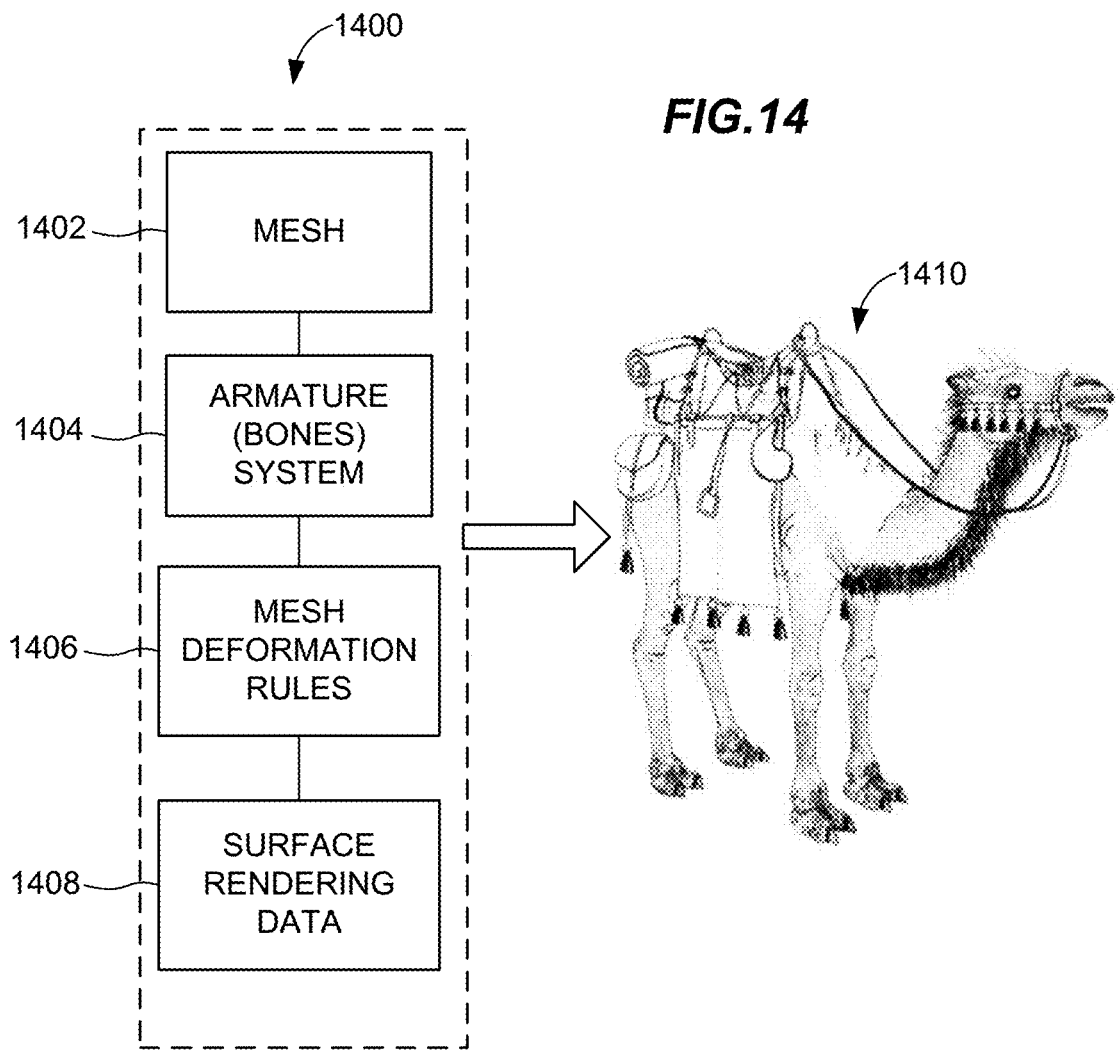
FIG. 14 is combined block diagram and rendering showing an example of a virtual social robot.

FIG. 14 shows an example of hardware or firmware components 1400 of a virtual social robot. Hardware components of the robot may be consistent with those shown and described in connection with FIG. 13. The software of firmware components 1400 may include a geometric mesh 1402, an armature or system of bones 1404, a set of mesh deformation rules 1406 governing how the mesh responds to movement of the armature 1404, and surface rendering data 1408 (e.g., diffuse, specular and bump or elevation maps). The software or firmware components may include any suitable elements as known in the art of model manipulation and rendering. The components may be configured in any desired way to result, when rendered, in a virtual social robot of any desired appearance 1410. A single virtual robot having a certain personality may even take on different appearances as a form of social expression. Technical aspects of manipulating and rendering virtual characters are well understood in the art and may readily be adapted to make use of environmental control based on social interaction techniques as described herein for social robots generally.

Figure 15:
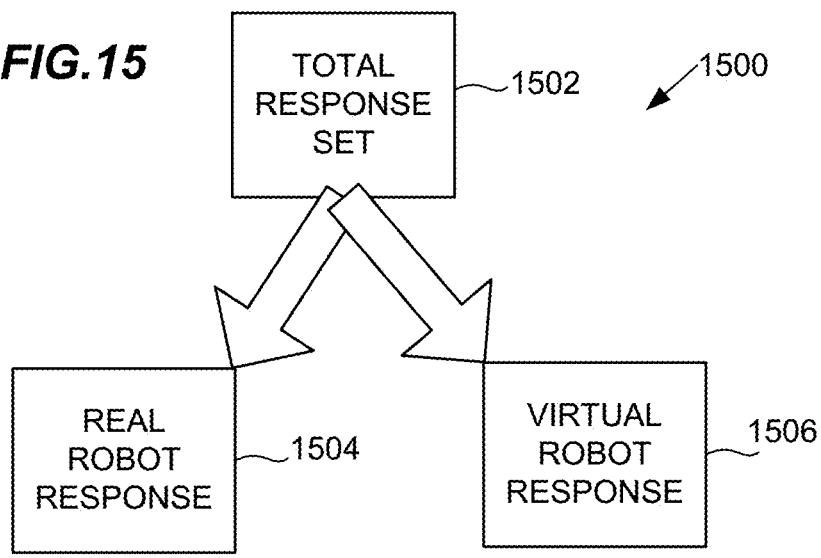
FIG. 15 is a concept diagram illustrating allocation of a response to coordinated real and virtual social robots.

Referring to FIG. 15, a real social robot and a virtual social robot may be coordinated 1500 to represent a unitary real-virtual social robot. For example, a real mobile social robot carrying a locating device might move around a physical play space for a virtual reality game (e.g., by moving over the floor, flying through the air, climbing walls, or combinations of these or other motions). One or more users each wearing virtual reality (or augmented reality) gear may see and hear a virtual social robot rendered in a virtual environment (or augmenting a real environment) at a location corresponding to a current location of the real social robot. The real social robot may move in response to the user actions in the real environment and in the virtual environment. For example, a game of Quidditch might be played in this way, or a similar game in which the Quidditch snitch is replaced by a character with personality, such as, for further example, a game of 'capture Bugs Bunny.' Many other use cases for mixed social robots are also possible. In each of these use cases, a control processor for the mixed reality session may allocate a unitary (total) behavior response set 1502 to a real response set 1504 and to a virtual social robots response set 1506. For example, overall motion response may be allocated to the real robot, and other responses (e.g., facial expressions and speech) allocated to the virtual robot. Stimuli is for triggering the response may, conversely, be detected by aggregating stimuli detected in the real and virtual contexts. The control processor may further synchronize the response sets 1504, 1506 so that the responses of the real social robot and the virtual social robot are coordinated. In other respects, providing an empathic environmental output (e.g., playing a video clip) in response to the user's social interactions with the robot may be performed as described elsewhere herein.

In view the foregoing, and by way of additional example, FIG. 16 shows aspects of a method 800 or methods for control of a social robot providing an empathic environmental output (e.g., playing a video clip or other non-robotic action) in response to the user's social interactions with the robot. The method 1800 may be performed by a computer processor controlling a real social robot, a mixed reality output device, a computer network, or combination of the foregoing, and components connected to the processor as described herein above. A real or virtual social robot that performs the method 1600 may include one or more processors coupled to at least one circuit for driving components of the social robot, such as, for example, the processor 1102 and associated circuit shown in FIG. 11. The social robot may further include a social expression component connected to the at least one circuit, the social expression component comprising a human-recognizable expressive feature controlled by the one or more processors according to a social behavior algorithm. For example, a real social robot may include a display screen 1216 portraying a face as shown in FIG. 12, while a virtual social robot may include rendering and modeling components for a character 1410 with a face. The social robot performing the method 1600 may further include at least one of a camera connected to the at least once circuit, positioned for observing a user interacting with the social robot or a microphone connected to the at least one circuit, positioned for receiving sound from the user. For example, the real social robot 102 shown in FIG. 1 includes both a camera 114 and a microphone 116. Virtual social robots may use a headset interface and receive data from a headset-mounted camera or microphone positioned to sense user actions. The social robot performing the method 1600 may further include a program memory, coupled to the at least one circuit and to the one or more processors, the program memory holding program instructions configured for execution by the one or more processors, causing the social robot to perform operations of the method. For example, a social robot may include a memory 106 as shown in FIG. 1, RAM 114 as shown in FIG. 11, or memory 1304 as shown in FIG. 13.

The method 1600 may include, at 1610, interacting socially with the user by operating a social expression component 112 (FIG. 2). The social expression component 112 may be coupled to the at least one circuit for driving components of the social robot. The social expression component may include a human-recognizable expressive feature (e.g., eyes, brow, mouth displayed on a video screen) controlled by the at least one circuit according to a social behavior algorithm. The social behavior algorithm may select social actions (e.g., smiling, frowning, speaking, turning, moving) for the robot, based on a detected social setting and user social responses.

The method 1600 may further include, at 1620, determining, by the one or more processors, user behavior based at least in part on data from a video camera and a microphone coupled to the at least one circuit. "Determining" is meant in the sense of recognizing the user behavior, based on input from a video camera or microphone. In an aspect, the source of information for the determining 1620 may include one or more physical sensors coupled to the processor, and the operation of determining 1620 includes recognizing the set of events based on data from the one or more sensors. Social action by the user excludes the issuing of a command by the user to the robot, with the intent that the robot automatically carry out the user command. However, social action may include a request by the user, in a context where the robot determines its response at least partly based on a social content in which the request is made, and not solely on the content of the request. The determining 1620 may include various modes of social action recognition as described, for example, in connection with blocks 302-310 of FIG. 3. Other techniques for social action recognition may also be used.

The method 1600 may further include, at 1630, correlating, by the one or more processors, the user behavior to social behavior of the social robot. The correlating 1630 may include filtering a cache of action data as described, for example, in connection with block 316 of FIG. 3 and FIG. 4, or a purely numeric correlation as described in connection with FIGS. 9-10. As explained herein above, the correlating develops a mental state indicator, and it is the mental state indicator that enables selection of empathic environmental action in response to social conduct of the user. Various examples of empathic action have be provided in the foregoing disclosure, for example, playing a selected video clip, altering the room lighting, playing mood music, and so forth.

The method 1600 may further include, at 1640, generating a data signal based on the correlating. For example, the processor may, after selecting a response for an output device in the user's environment, encode instructions for causing the output device to perform the response on a communications layer of a network to which the output device is connected. The method 1600 may further include, at 1650, outputting the data signal configured for causing an electronic output device to respond to information encoded by the data signal. For example, the processor may send the data signal to a transmitter component of the social robot, which transmits it to the output device.

In an embodiment of the method, the robot includes an electronic substrate holding one or more processors coupled to a memory and to at least one circuit for driving components of the robot. In such embodiments causing the robot to perform the response may include sending an electrical signal to the circuit, wherein the signal is configured to cause a motor connected to the circuit to move a part of the robot (e.g., a head, neck, or appendage). In addition, or in an alternative, the robot includes an electronic substrate holding the processor operatively coupled to a memory and to a social expression component 112 (FIG. 2), the social expression component comprising a human-recognizable expressive feature controlled by the one or more processors according to a social behavior algorithm. In such embodiments, causing the robot to perform the response may include sending an electrical signal to the social expression component 112, the signal configured to cause movement of the expressive features. For example, the social expression component may include a video display screen, and the robot may send a video signal that encodes one or more human-recognizable expressive features (for example, at least two such features) to the display screen, causing animation of those features in a facial expression.

In an alternative embodiment, the robot includes a processor coupled to a memory, to a user input port, and to a video output device, for example, a video screen, projector, virtual reality headset, or augmented reality headset. The user experience of the social behavior of the robot may be entirely virtual. In such embodiments causing the robot to perform the response may include modeling an animation of a model in a virtual computer environment, rendering the environment and robot, and sending an electrical signal to the video output device, causing it to output a video or equivalent moving image of the robot performing the response. In such embodiments, the source of information about events experienced by the robot may include a computer model of the virtual environment in which the robot acts and recognizing the stimulus may include tracking activity of the computer model.

FIGS. 17 and 18 show additional operations 1700 and 1800 that may be incorporated into the method 1600. Any one or more of the additional operations 1700 or 1800 may be combined, in any operative order, with other operations of the method 1600. Organization of the operations 1700 and 1800 into separate figures is merely for illustrative convenience and should not be interpreted as significant to the disclosed method.

Referring to FIG. 17, the method 1600 may include any one or more of the additional operations 1700. The method 1600 may include, at 1710, determining a current mental state indicator based on the correlating. The mental state indicator may be determined as described, for example, in connection with block 316 of FIG. 3 and FIG. 4, or as described in connection with FIGS. 9-10. In an alternative, the correlating may be accomplished without deriving a single symbolic indicator, such as, for example, by determining multiple indicators, or by using a relational data structure to correlate user behavior to social behavior of the robot.

The method 1600 may include, at 1720, causing selection of an identifier of a prerecorded audio-video content clip based on comparing semantic metadata associated with the identifier to the current mental state indicator. More detailed aspects of selecting a pre-recorded audio-video clip are described herein above in connection with FIGS. 5 and 6. In an aspect, a local or remote database of content may be selectively shared with the user of the social robot, in response to the current mental state indicator or in response to an anticipated future condition. For example, the database of content may include video clips, audio-video clips, or audio clips that are indexed based on their semantic content. The social robot may be configured to output a selected one of the clips for any social purpose. For example, if the social robot senses that its user is unhappy, it may select a humorous clip from clips of the user's known favorite content or characters. For further example, if the social robot is commenting on a sensed social situation, for example, to encourage the user to get some exercise, it might play a clip that is marked as appropriate for users with personal or demographic characteristics that matches the user's that in some way reminds the user to get up and do some exercise. Accordingly, users may be entertained by the context and selection of clips selected by the social robot's content selection algorithm. In more detailed aspects, and for further example, the robot may:

- learn what type of relevant content clips the current user or users are likely to pay attention to, for example by identifying areas, genres, works (prose, poetry, pictures, videos, art, etc.) that interest the target user(s) by questioning or otherwise 'testing' the target users(s) for interest levels, and then audio-visually output the selected content clips;
- wirelessly send selected content clips (or have them sent from a remote server) to audiovisual display gear (e.g., speakers, a phone, a tablet, a PC, a smart TV, an AR headset/glasses, etc.) independent of the robot so that the target user(s) can see and/or hear the content clip synchronized to a social interaction involving the social robot, or in response to an authorized user request;
- command a wireless device such as, for example, the Amazon™ Echo™ and Fire Stick™, to tune in or otherwise obtain relevant content for the target user(s), wherein the content is selected by the social robot based on user/situational parameters or selected by the user.

The method 1600 may include, at 1730, transmitting the current mental state indicator to a remote server, and receiving the identifier for the pre-recorded audio-video content clip from the remote server. Accordingly, the robot may rely on another network node to perform content selection. The selected content may be streamed or otherwise provided from any suitable network node to the selected output device. In an aspect, the social robot's memory may hold identifiers for prerecorded audio-video content clips each associated with semantic metadata pertaining to corresponding ones of the content clips. In such case, the method 1600 may include, at 1730, causing the social robot to perform executing a content-selection algorithm, thereby causing the selection of the identifier.

The method 1600 may include, at 1740, performing the correlating at least in part by determining the current mental state indicator such that the indicator indicates at least one of an indicator of a user mood or an indicator of a user desire. For example, a frown may be interpreted as indicating an unhappy mood. Restless behavior may be interpreted as indicating a desire for something different or stimulation.

In an aspect, the electronic output device may be, or may include, an audio-video output device. The method 1600 may include, at 1750, causing the social robot to perform configuring the data signal so that the prerecorded audio-video content clip is output by the audio-video output device. For example, the social robot may stream the audio-video clip to the output device, send it over an internal bus to a video output device integrated into the social robot's circuitry, or send a file containing the audio-video clip to the output device. The audio-video output device may be coupled to the social expression component, for example, a video output device may be coupled to the social robot over a computer network. In an alternative, the social expression component may be, or may include, the audio-video output device, for example, a video screen for supplying the robot's facial expressions may also serve for outputting the video.

Referring to FIG. 18, the method 1600 may include any one or more of the additional operations 1800. The method 1600 may include, at 1810, configuring the data signal for causing the electronic output device to respond, wherein the electronic output device comprises at least one of a home appliance or motor vehicle and the information encoded by the data signal comprises operating instructions for the home appliance or motor vehicle. Examples of operating a home appliance in response to the correlating (e.g., using a mental state indicator) are described above, for example, in connection with FIG. 1.

As noted above, the social robot may include a specialized biometric sensor, for example, a pulse sensor, skin temperature sensor, or gaze direction sensor. The biometric sensor may be coupled to at least one circuit for providing a data signal responsive to a bodily state of the user. In such case, the method 1600 may include, at 1820, determining the current mental state indicator further based on a data signal from the biometric sensor. The biometric sensor may be coupled to the at least one circuit via an intervening wireless receiver and transmitter pair.

The method 1600 may include, at 1830, selecting a response to be caused by sending the data signal to the output device further based on a detected context in which a social interaction with the user is occurring. For example, the social robot may select different content for play, depending on whether or not the user is a home, in an office environment, or is near other people. In an aspect, the method may include, at 1840, selecting the response further based on a location beacon or other IOT MEMS signal. For example, the social robot may receive a wireless beacon from a transmitter located in the area, with location or current event information. The social robot may include the location or current event information as an additional filter that excludes otherwise relevant empathic actions. In an alternative, the robot may use the beacon information as an attractor, that includes additional empathic actions in the response list. The method 1600 may include further, more detailed operations in connection with the steps summarized above, as described in the foregoing description.

Figure 19:
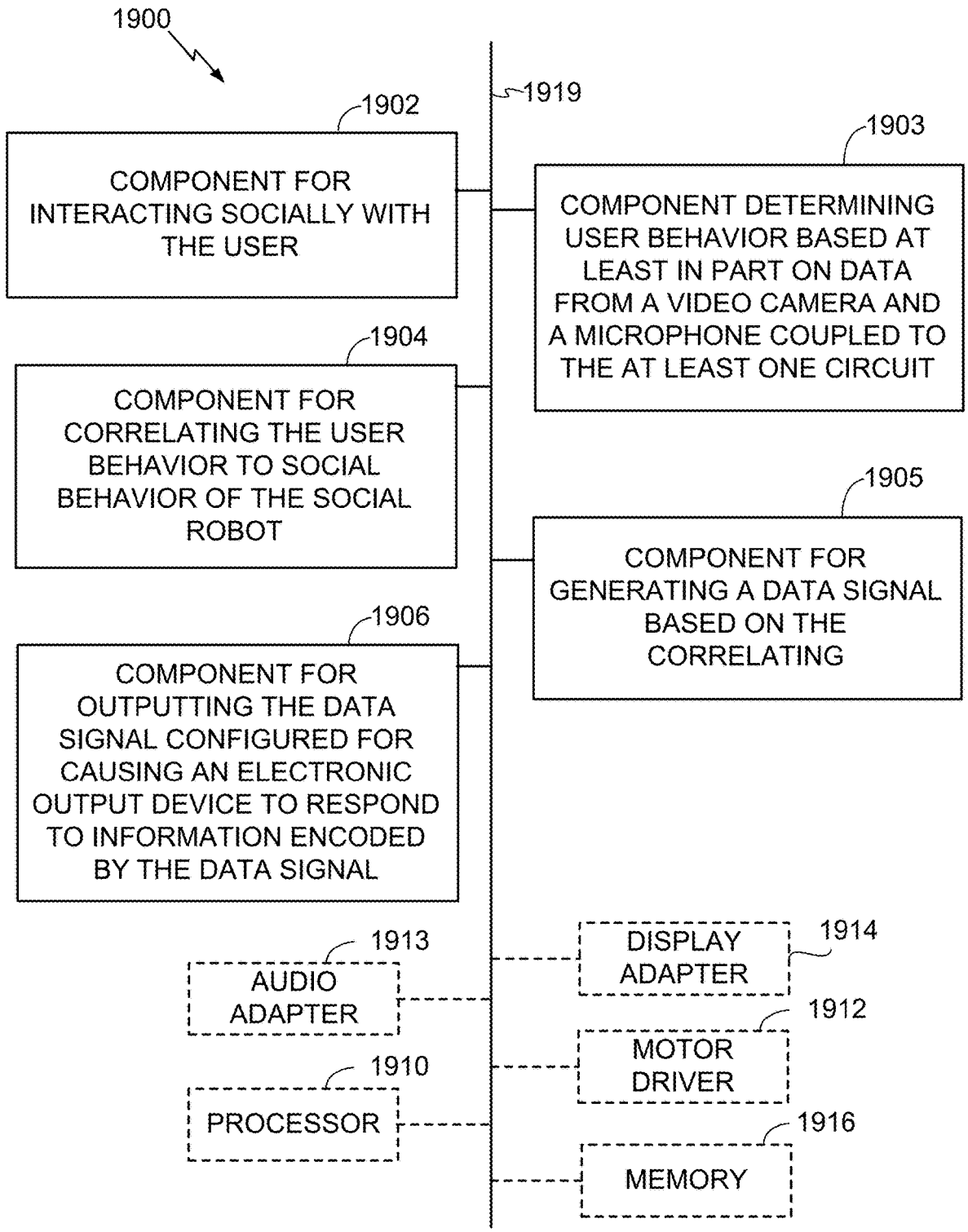
FIG. 19 is a block diagram, illustrating an example of a social robot configured for performing the method of FIG. 16.

FIG. 19 is a conceptual block diagram illustrating components of an apparatus or system 1900 for control of a social robot providing an empathic environmental output (e.g., playing a video clip or other non-robotic action) in response to the user's social interactions with the robot. The apparatus or system 1900 may include additional or more detailed components for performing functions or process operations as described herein. For example, the processor 1910 and memory 1916 may contain an instantiation of a process for providing an empathic environmental output in response to the user's social interactions with the robot. As depicted, the apparatus or system 1900 may include functional blocks that can represent functions implemented by a processor, software, or combination thereof (e.g., firmware).

As illustrated in FIG. 19, the apparatus or system 1900 may comprise an electrical component 1902 for interacting socially with the user. The component 1902 may be, or may include, a means for said interacting. Said means may include the processor 1910 coupled to the memory 1916, the processor executing an algorithm based on program instructions stored in the memory. Such algorithm may include a sequence of more detailed operations for interacting socially with the user, for example, as described in connection with FIGS. 1-2. For example, said means may include a social expression component coupled to at least one circuit for driving components of the social robot. The social expression component may include a human-recognizable expressive feature controlled by at least one circuit of the robot according to a social behavior algorithm, wherein the at least one circuit comprises one or more processors.

The apparatus 1900 may further include an electrical component 1903 for determining user behavior based at least in part on data from a video camera and a microphone coupled to the at least one circuit. The component 1903 may be, or may include, a means for said determining. Said means may include the processor 1910 coupled to the memory 1916 and to at least one sensor (not shown), the processor executing an algorithm based on program instructions stored in the memory. Such algorithm may include a sequence of more detailed operations, for example, as described in connection with FIG. 3 at blocks 302-310.

The apparatus 1900 may further include an electrical component 1904 for correlating the user behavior to social behavior of the social robot. The component 1904 may be, or may include, a means for said correlating. Said means may include the processor 1910 coupled to the memory 1916, the processor executing an algorithm based on program instructions stored in the memory. Such algorithm may include a sequence of more detailed operations, for example, any of the processes for deriving a mental state indicator as described herein above, such as in connection with FIG. 4, or FIGS. 9-10.

The apparatus 1900 may further include an electrical component 1905 for generating a data signal based on the correlating. The component 1905 may be, or may include, a means for said generating. Said means may include the processor 1910 coupled to the memory 1916, the processor executing an algorithm based on program instructions stored in the memory. Such algorithm may include a sequence of more detailed operations, for example, receiving identifiers for a desired action by an output device, and encoding an instruction to perform the action according to an application interface for the output device.

The apparatus 1900 may further include an electrical component 1906 for outputting the data signal configured for causing an electronic output device to respond to information encoded by the data signal, generating an empathetic response. The component 1906 may be, or may include, a means for said outputting. Said means may include the processor 1910 operatively coupled to the memory 1916, and to one or more of the motor driver 1912, the audio adapter 1913, the display adapter 1914, or to a network interface module, the processor executing an algorithm based on program instructions stored in the memory. Such algorithm may include a sequence of more detailed operations, for example, addressing the data signal to a selected output device, providing the addressed data signal to a network interface module, and sending the data signal to the output device via the network interface module.

The apparatus 1900 may optionally include a processor module 1910 having at least one processor. The processor 1910 may be in operative communication with the modules 1902-1906 via a bus 1913 or similar communication coupling. In the alternative, one or more of the modules may be instantiated as functional modules in a memory of the processor. The processor 1910 may effect initiation and scheduling of the processes or functions performed by electrical components 1902-1906.

In related aspects, the apparatus 1900 may include a network interface module (not shown) operable for communicating with system components over a computer network, instead of or in addition to the transceiver 1912. A network interface module may be, or may include, for example, an Ethernet port or serial port (e.g., a Universal Serial Bus (USB) port). In further related aspects, the apparatus 1900 may optionally include a module for storing information, such as, for example, a memory device 1916. The computer readable medium or the memory module 1916 may be operatively coupled to the other components of the apparatus 1900 via the bus 1913 or the like. The memory module 1916 may be adapted to store computer readable instructions and data for effecting the processes and behavior of the modules 1902-1906, and subcomponents thereof, or the processor 1910, or the method 1600 and one or more of the additional operations 1700 or 1800 disclosed herein. The memory module 1916 may retain instructions for executing functions associated with the modules 1902-1906. While shown as being external to the memory 1916, it is to be understood that the modules 1902-1906 can exist within the memory 1916 or an on-chip memory of the processor 1910.

The apparatus 1900 may include a transceiver (not shown) configured as a wireless transmitter/receiver, or a wired transmitter/receiver, for transmitting and receiving a communication signal to/from another system component. In alternative embodiments, the processor 1910 may include networked microprocessors from devices operating over a computer network. In addition, the apparatus 1900 may include an audio adapter 1913 for providing an audio signal to an audio output device, causing the output device to vocalize a social robot response to a user. The apparatus 1900 may include display adapter 1914 for providing a video signal for a virtual environment, a social robot output for a user, or both. The apparatus 1900 may include a motor driver for providing electrical power to a motor, causing the motor to move a part of the social robot in a manner that provides a social action for the user to experience.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets or glasses), computers (desktop and mobile), smart phones, personal digital assistants (PDAs), tablets, motor vehicles or vessels, including self-driving cars, and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server. In another alternative, operational aspects disclosed herein may be embodied in a stream of software that is fed in real time or near-real time to the robot hardware that is then executed by a processor or software module, or a combination of the two. In this manner, computational power can be off-loaded to the cloud so that the robot's on-board processing can be limited while the cloud-based computational power can be virtually unlimited, allowing more sophisticated inputs, subsequent analyses, recognition and/or responses, and related computational tasks to be accomplished in the cloud.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to processing circuits for social robots.

The invention claimed is:

1. A social robot, comprising:
   one or more processors coupled to at least one circuit for driving components of the social robot;
   a social expression component connected to the at least one circuit, the social expression component comprising a human-recognizable expressive feature controlled by the one or more processors according to a social behavior algorithm, wherein the human-recognizable expressive feature comprises at least one of a display screen configured for displaying facial expressions or a mechanism for moving a head of the social robot;
   at least one of a camera connected to the at least once one circuit, positioned for observing a user interacting with the social robot or a microphone connected to the at least one circuit, positioned for receiving sound from the user; and
   a program memory, coupled to the at least one circuit and to the one or more processors, the program memory holding program instructions configured for execution by the one or more processors, causing the social robot to perform operations comprising:
   interacting socially with the user by the social expression component;
   determining user behavior based at least in part on data from the at least one of the camera or the microphone;
   correlating the user behavior to social behavior of the social robot;
   generating an electronic control signal based on the correlating, the generating comprising determining a current mental state indicator based on the correlating, comparing metadata for prospective responses to a representation of the mental state indicator, identifying one of the prospective responses at least in part by the representation, and configuring the electronic control signal to indicate the identified the prospective responses; and
   transmitting the control signal configured for causing an electronic output device to respond to information encoded by the control signal.

2. The social robot of claim 1, wherein generating the electronic control signal comprises causing the social robot to select an identifier of a prerecorded audio-video content clip based on comparing semantic metadata associated with the identifier to the current mental state indicator.

3. The social robot of claim 2, wherein the operations further comprise for causing the social robot to perform transmitting the current mental state indicator to a remote server and receiving the identifier from the remote server.

4. The social robot of claim 2, wherein the program memory holds identifiers for prerecorded audio-video content clips each associated with semantic metadata pertaining to corresponding ones of the content clips, and wherein the operations further comprise causing the social robot to perform executing a content-selection algorithm, thereby causing the selection of the identifier.

5. The social robot of claim 1, wherein generating the control signal further comprises identifying the one of the prospective responses at least in part by scoring response actions against the mental state indicator using a numeric scoring system.

6. The social robot of claim 2, wherein the electronic output device comprises an audio-video output device, and wherein the operations further comprise configuring the control signal so that the prerecorded audio-video content clip is output by the audio-video output device.

7. The social robot of claim 6, further wherein the audio-video output device is coupled to the social expression component.

8. The social robot of claim 6, wherein the social expression component comprises the audio-video output device.

9. The social robot of claim 2, wherein the operations further comprise executing a content-selection algorithm including selection of the identifier based on the current mental state indicator that includes at least one of a user mood or a user desire.

10. The social robot of claim 1, wherein the operations further comprise configuring the control signal for causing the electronic output device to respond, wherein the electronic output device comprises at least one of a home appliance or motor vehicle, and wherein the information encoded by the control signal comprises operating instructions for the home appliance or motor vehicle.

11. The social robot of claim 1, wherein the social expression component comprises a face component connected to the at least one circuit, the face component comprising at least two human-recognizable expressive features controlled by the one or more processors and selected from: a configurable brow, at least one configurable eye, and a configurable mouth.

12. The social robot of claim 2, wherein a biometric sensor is coupled to at least one circuit for providing a control signal responsive to a bodily state of the user, and wherein the operations further comprise determining the current mental state indicator further based on the control signal from the biometric sensor.

13. The social robot of claim 12, wherein the biometric sensor is coupled to the at least one circuit via an intervening wireless receiver and transmitter pair.

14. A method for controlling an environment of a social robot based on a prior social interaction between the social robot and a user thereof, the method comprising:
   interacting socially with the user by operating a social expression component coupled to at least one circuit for driving components of the social robot and comprising a human-recognizable expressive feature controlled by the at least one circuit according to a social behavior algorithm, wherein the human-recognizable expressive feature comprises at least one of a display screen configured for displaying facial expressions or a mechanism for moving a head of the social robot and the at least one circuit comprises one or more processors;
   determining, by the one or more processors, user behavior based at least in part on data from a video camera and a microphone coupled to the at least one circuit;
   correlating, by the one or more processors, the user behavior to social behavior of the social robot;
   generating an electronic control signal based on the correlating, the generating comprising determining a current mental state indicator based on the correlating, comparing metadata for prospective responses to a representation of the mental state indicator, identifying one of the prospective responses at least in part by the representation, and configuring the electronic control signal to indicate the identified one of the prospective responses; and
   outputting the control signal configured for causing an electronic output device to respond to information encoded by the control signal.

15. The method of claim 14, further comprising selecting an identifier of a prerecorded audio-video content clip based on comparing semantic metadata associated with the identifier to the current mental state indicator.

16. The method of claim 15, further comprising transmitting the current mental state indicator to a remote server and receiving the identifier from the remote server.

17. The method of claim 15, wherein a memory coupled to the one or more processors holds identifiers for prerecorded audio-video content clips each associated with semantic metadata pertaining to corresponding ones of the content clips, and further comprising executing a content-selection algorithm, thereby causing the selection of the identifier.

18. The method of claim 14, wherein the generating the control signal further comprises identifying the one of the prospective responses at least in part by scoring response actions against the mental state indicator using a numeric scoring system.

19. The method of claim 15, wherein the electronic output device comprises an audio-video output device, and further comprising configuring the control signal so that the prerecorded audio-video content clip is output by the audio-video output device.

20. The method of claim 14, wherein the electronic output device comprises at least one of a home appliance or motor vehicle, and the information encoded by the control signal comprises operating instructions for the home appliance or motor vehicle.

21. The method of claim 14, further comprising determining the current mental state indicator further based on a data signal from a biometric sensor configured to provide the data signal responsive to a bodily state of the user.

* * * * *

UNITED STATES PATENT AND TRADEMARK OFFICE
CERTIFICATE OF CORRECTION

| | | |
|---|---|---|
| PATENT NO. | : 12,011,822 B2 | Page 1 of 1 |
| APPLICATION NO. | : 17/842730 | |
| DATED | : June 18, 2024 | |
| INVENTOR(S) | : Gregory I. Gewickey and Lewis S Ostrover | |

It is certified that error appears in the above-identified patent and that said Letters Patent is hereby corrected as shown below:

In the Claims

In Column 30, Line 4, after "the at least" delete "once"

Signed and Sealed this
Tenth Day of December, 2024

*Katherine Kelly Vidal*

Katherine Kelly Vidal
*Director of the United States Patent and Trademark Office*